United States Patent
Kim et al.

(10) Patent No.: US 12,458,677 B2
(45) Date of Patent: Nov. 4, 2025

(54) **METHOD FOR PREPARING *GYNOSTEMMA PENTAPHYLLUM* LEAF EXTRACT AND *GYNOSTEMMA PENTAPHYLLUM* LEAF EXTRACT PREPARED THEREBY**

(71) Applicant: BIONIC TRADING CORPORATION, Gyeonggi-do (KR)

(72) Inventors: Tae Young Kim, Gyeonggi-do (KR); Yong Duk Kim, Gyeonggi-do (KR); Jae Wo Lee, Gyeonggi-do (KR); Yoon Hee Kim, Gyeonggi-do (KR); Kang Hyun Jeong, Gyeonggi-do (KR); Jae Sun Lee, Gyeonggi-do (KR)

(73) Assignee: BIONIC TRADING CORPORATION, Gyeonggi-do (KR)

( * ) Notice: Subject to any disclaimer, the term of this patent is extended or adjusted under 35 U.S.C. 154(b) by 329 days.

(21) Appl. No.: 18/322,817

(22) Filed: May 24, 2023

(65) Prior Publication Data
US 2024/0041964 A1 Feb. 8, 2024

(30) Foreign Application Priority Data
Jul. 28, 2022 (KR) .......... 10-2022-0093931

(51) Int. Cl.
| | |
|---|---|
| A61K 36/424 | (2006.01) |
| A61K 9/00 | (2006.01) |
| A61K 9/16 | (2006.01) |
| A61K 9/20 | (2006.01) |
| A61K 9/48 | (2006.01) |
| A61K 47/12 | (2006.01) |
| A61K 47/26 | (2006.01) |
| A61K 47/40 | (2006.01) |
| A61K 47/46 | (2006.01) |
| A61P 3/04 | (2006.01) |
| A61P 21/00 | (2006.01) |

(52) U.S. Cl.
CPC .......... *A61K 36/424* (2013.01); *A61K 9/0019* (2013.01); *A61K 9/0095* (2013.01); *A61K 9/1623* (2013.01); *A61K 9/1652* (2013.01); *A61K 9/2018* (2013.01); *A61K 9/4825* (2013.01); *A61K 9/4875* (2013.01); *A61K 47/12* (2013.01); *A61K 47/26* (2013.01); *A61K 47/40* (2013.01); *A61K 47/46* (2013.01); *A61P 3/04* (2018.01); *A61P 21/00* (2018.01); *A61K 2236/17* (2013.01); *A61K 2236/331* (2013.01); *A61K 2236/333* (2013.01)

(58) Field of Classification Search
None
See application file for complete search history.

(56) References Cited

U.S. PATENT DOCUMENTS

| | | | |
|---|---|---|---|
| 2011/0015142 A1 | 1/2011 | Huh | |
| 2019/0201468 A1* | 7/2019 | Kim | A61K 36/424 |

FOREIGN PATENT DOCUMENTS

| | | |
|---|---|---|
| CN | 102552371 | 7/2012 |
| KR | 101969062 | 4/2019 |
| KR | 102064387 | 1/2020 |

OTHER PUBLICATIONS

Lee, H.S., et al., "*Gynostemma pentaphyllum* Extract Ameliorates High-Fat Diet-Induced Obesity in C57BL/6N Mice by Upregulating SIRT1." Nutrients vol. 11,10 2475. Oct. 15, 2019, doi:10.3390/nu11102475.

Kim, Y.H., et al. "*Gynostemma pentaphyllum* extract and its active component gypenoside L improve the exercise performance of treadmill-trained mice." Nutrition research and practice vol. 16,3 (2022): 298-313. doi:10.4162/nrp.2022.16.3.298.

Chen, D.-J., et al., "Metabolic profiling of *Gynostemma pentaphyllum* extract in rat serum, urine and faeces after oral administration," Journal of Chromatography B (2014), http://dx.doi.org/10.1016/j.jchromb.2014.08.003.

Hwang, S.-L., et al., "Beneficial effects of b-sitosterol on glucose and lipid metabolism in L6 myotube cells are mediated by AMP-activated protein kinase", Biochemical and Biophysical Research Communications 377 (2008) 1253-1258.

Hwang, S.-L., et al., "Isodihydrocapsiate stimulates plasma glucose uptake by activation of AMP-activated protein kinase," Biochemical and Biophysical Research Communications 371 (2008) 289-293.

* cited by examiner

*Primary Examiner* — Dominic Lazaro
(74) *Attorney, Agent, or Firm* — DUANE MORRIS LLP; Gregory M. Lefkowitz

(57) ABSTRACT

The present disclosure relates to a method for preparing a *Gynostemma pentaphyllum* leaf extract, a *Gynostemma pentaphyllum* leaf extract prepared by the method, and a composition for improving exercise performance capacity containing the same as an active ingredient.

The *Gynostemma pentaphyllum* leaf extract according to the present disclosure exhibits superior effect of improving exercise performance capacity and enhancing muscle strength, endurance and physical strength. In addition, the *Gynostemma pentaphyllum* leaf extract according to the present disclosure has the efficacy of increasing AMPK activity, facilitating beta oxidation and facilitating glucose uptake and, thus, has superior effect of reducing body weight and body fat and preventing, alleviating or treating diabetes. Because the composition of the present disclosure is derived from a natural product, it can be used usefully and safely for drugs, foods, etc. without side effects.

15 Claims, 2 Drawing Sheets
Specification includes a Sequence Listing.

```
SEQUENCE LISTING

Sequence total quantity: 18
SEQ ID NO: 1            moltype = DNA  length = 20
FEATURE                 Location/Qualifiers
source                  1..20
                        mol_type = other DNA
                        organism = synthetic construct
SEQUENCE: 1
gtccagagag tcggcaagtc                                               20

SEQ ID NO: 2            moltype = DNA  length = 20
FEATURE                 Location/Qualifiers
source                  1..20
                        mol_type = other DNA
                        organism = synthetic construct
SEQUENCE: 2
gtcggtgatc gtgagacctt                                               20

SEQ ID NO: 3            moltype = DNA  length = 20
FEATURE                 Location/Qualifiers
source                  1..20
                        mol_type = other DNA
                        organism = synthetic construct
SEQUENCE: 3
tctactcggc cacaggcgct                                               20

SEQ ID NO: 4            moltype = DNA  length = 20
FEATURE                 Location/Qualifiers
source                  1..20
                        mol_type = other DNA
                        organism = synthetic construct
SEQUENCE: 4
cttgacagct cccgccgcaa                                               20

SEQ ID NO: 5            moltype = DNA  length = 22
FEATURE                 Location/Qualifiers
source                  1..22
                        mol_type = other DNA
                        organism = synthetic construct
SEQUENCE: 5
ctgtgtggat tggtggctct at                                            22
```

```
SEQ ID NO: 6              moltype = DNA   length = 23
FEATURE                   Location/Qualifiers
source                    1..23
                          mol_type = other DNA
                          organism = synthetic construct
SEQUENCE: 6
gtgtaaaacg cagctcagta aca                                           23

SEQ ID NO: 7              moltype = DNA   length = 20
FEATURE                   Location/Qualifiers
source                    1..20
                          mol_type = other DNA
                          organism = synthetic construct
SEQUENCE: 7
ggatggtgcc cctgggtcct                                               20

SEQ ID NO: 8              moltype = DNA   length = 20
FEATURE                   Location/Qualifiers
source                    1..20
                          mol_type = other DNA
                          organism = synthetic construct
SEQUENCE: 8
tggccttcgc tgtgagtcgc                                               20

SEQ ID NO: 9              moltype = DNA   length = 20
FEATURE                   Location/Qualifiers
source                    1..20
                          mol_type = other DNA
                          organism = synthetic construct
SEQUENCE: 9
tgggctgcca caagccagac                                               20

SEQ ID NO: 10             moltype = DNA   length = 20
FEATURE                   Location/Qualifiers
source                    1..20
                          mol_type = other DNA
                          organism = synthetic construct
SEQUENCE: 10
cagcccagcc actggcatca                                               20

SEQ ID NO: 11             moltype = DNA   length = 20
FEATURE                   Location/Qualifiers
source                    1..20
                          mol_type = other DNA
                          organism = synthetic construct
SEQUENCE: 11
atgtgtcgcc ttcttgctct                                               20

SEQ ID NO: 12             moltype = DNA   length = 20
FEATURE                   Location/Qualifiers
source                    1..20
                          mol_type = other DNA
                          organism = synthetic construct
SEQUENCE: 12
atctactgcc tggggacctt                                               20

SEQ ID NO: 13             moltype = DNA   length = 20
FEATURE                   Location/Qualifiers
source                    1..20
                          mol_type = other DNA
                          organism = synthetic construct
SEQUENCE: 13
aaggggatgg agaccacagt                                               20

SEQ ID NO: 14             moltype = DNA   length = 20
FEATURE                   Location/Qualifiers
source                    1..20
                          mol_type = other DNA
                          organism = synthetic construct
SEQUENCE: 14
tgaggtggga gctgataggg                                               20

SEQ ID NO: 15             moltype = DNA   length = 20
FEATURE                   Location/Qualifiers
source                    1..20
                          mol_type = other DNA
                          organism = synthetic construct
SEQUENCE: 15
```

```
                                    -continued
tggacccaag cattacggac                                                    20

SEQ ID NO: 16          moltype = DNA   length = 20
FEATURE                Location/Qualifiers
source                 1..20
                       mol_type = other DNA
                       organism = synthetic construct
SEQUENCE: 16
ggtcatttca ccgccctgta                                                    20

SEQ ID NO: 17          moltype = DNA   length = 20
FEATURE                Location/Qualifiers
source                 1..20
                       mol_type = other DNA
                       organism = synthetic construct
SEQUENCE: 17
gcttccagga ggctaaggat                                                    20

SEQ ID NO: 18          moltype = DNA   length = 20
FEATURE                Location/Qualifiers
source                 1..20
                       mol_type = other DNA
                       organism = synthetic construct
SEQUENCE: 18
cccaatccca atgacaactc                                                    20
```

METHOD FOR PREPARING *GYNOSTEMMA PENTAPHYLLUM* LEAF EXTRACT AND *GYNOSTEMMA PENTAPHYLLUM* LEAF EXTRACT PREPARED THEREBY

CROSS-REFERENCE TO RELATED APPLICATION

This application claims priority to Korean Patent Application No. 10-2022-0093931 filed on Jul. 28, 2022, and all the benefits accruing therefrom under 35 U.S.C. § 119, the contents of which in its entirety are herein incorporated by reference.

SEQUENCE LISTING

The instant application contains a Sequence Listing which has been submitted electronically in a computer readable Sequence Listing XML format and is hereby incorporated by reference in its entirety. Said computer readable Sequence Listing in XML format was created on May 24, 2023, is named G1035-25201_SequenceListing.xml and is 16,918 bytes in size.

BACKGROUND

1. Field

The present disclosure relates to a method for preparing a *Gynostemma pentaphyllum* leaf extract, a *Gynostemma pentaphyllum* leaf extract prepared by the method, and a composition for improving exercise performance capacity, preventing, alleviating or treating muscular diseases or muscle damage, or reducing body fat, which contains the same as an active ingredient.

2. Description of the Related Art

In the complex modern society, interests in promotion of health are increasing day by day among people who are exposed to aggravated living environments due to environmental pollution, increased mental stress, lack of activities, etc. Although exercise is the most effective and economical preventive measure against adult diseases or aging, those who find little time for health care due to busy everyday lives, fatigue, etc. are interested in various functional foods as alternative to exercise. In addition, athletes use ergogenic aid to increase the efficiency of exercise performance in addition to scientific training and diets. Because the ergogenic aids are effective not only in improving exercise performance capacity but also in removing fatigue factors which are accumulated in the body during physical activities and induce fatigue, they are commonly used by ordinary people in addition to athletes.

Researches on functional aids for improving exercise capacity are being conducted actively across the globe. Although the functional aids including steroids, caffeine, sodium bicarbonate, sodium citrate, etc. improve exercise performance capacity and provide vigor to everyday lives, the effects are only temporary and they may result in fatal side effects.

Therefore, the necessity of the development of functional aids using natural products with proven safety such as plant extracts is emerging recently.

Muscle sustains and protects bones and internal organs and enables motion of other tissues such as heartbeats. Because it greatly affects not only physical activities but also nutrient metabolism, muscle is closely related with the onset of metabolic diseases such as type 2 diabetes, obesity, cardiovascular diseases, etc. Untreated muscular diseases can lead to severe health problems and the changes occurring due to muscle loss can cause incompetent physical performance and detrimental health conditions by worsening physical health.

Muscle reduction can aggravate arthritis, low back pain and chronic pain as well as urinary incontinence through abdominal obesity, and bone fracture may increase depression in the elderly. Therefore, sarcopenia in the elderly is associated with various diseases and is the major cause that comprises the quality of life. Because sarcopenia is known to be closely related with senile chronic diseases such as osteoporosis, insulin resistance and arthritis, decreased ability of physical activity due to aging can be suppressed by preventing or alleviating sarcopenia.

The inventors of the present disclosure have researched on substances exhibiting superior effect of improving exercise performance capacity and alleviating or treating muscular diseases. In doing so, they have found out that a *Gynostemma pentaphyllum* leaf extract treated with an acid under a specific condition has an effect of improving exercise performance capacity and alleviating or treating muscular diseases and has a remarkably enhanced effect of reducing body weight and body fat, and have completed the present disclosure.

REFERENCES OF THE RELATED ART

Patent Documents (Patent document 001) KR 10-2064387 B1.

SUMMARY

The present disclosure is directed to providing a method for preparing a *Gynostemma pentaphyllum* leaf extract capable of improving exercise performance capacity.

The present disclosure is also directed to providing a *Gynostemma pentaphyllum* leaf extract effective in improving exercise performance capacity.

The present disclosure is also directed to providing a food composition for improving exercise performance capacity, which contains a *Gynostemma pentaphyllum* leaf extract as an active ingredient.

The present disclosure is also directed to providing a pharmaceutical composition for improving exercise performance capacity, which contains a *Gynostemma pentaphyllum* leaf extract as an active ingredient.

The present disclosure is also directed to providing a food composition for preventing or treating a muscle damage caused by declined muscular function, muscular wasting or muscular atrophy, which contains a *Gynostemma pentaphyllum* leaf extract as an active ingredient.

The present disclosure is also directed to providing a food composition for reducing body weight and body fat, which contains a *Gynostemma pentaphyllum* leaf extract as an active ingredient.

The present disclosure is also directed to providing a food composition for preventing or alleviating diabetes, which contains a *Gynostemma pentaphyllum* leaf extract as an active ingredient.

The present disclosure provides a method for preparing a *Gynostemma pentaphyllum* leaf extract containing gypenoside L and gypenoside LI at a weight ratio of 100:20-80, which includes: (1) a step of preparing a *Gynostemma* pentaphyllum leaf extract by extracting dried *Gynostemma pentaphyllum* leaf with water, a $C_1$-$C_4$ lower alcohol or a mixed solvent thereof; and (2) a step of adding an organic acid to the *Gynostemma pentaphyllum* leaf extract and then conducting acid treatment at 60-100° C.

According to an exemplary embodiment of the present disclosure, the step (1) may include: (a) a step of preparing a *Gynostemma pentaphyllum* leaf extract by extracting *Gynostemma pentaphyllum* leaf with water, a $C_1$-$C_4$ lower alcohol or a mixed solvent thereof; (b) a step of preparing an extract of a *Gynostemma pentaphyllum* leaf extract residue by extracting a residue remaining after the extraction of the *Gynostemma pentaphyllum* leaf with water, a $C_1$-$C_4$ lower alcohol or a mixed solvent thereof; and (c) a step of mixing the extract of the step (a) and the extract of the step (b).

According to an exemplary embodiment of the present disclosure, the mixed solvent of the step (1) may be 20-80 vol % of methanol, ethanol, butanol or propanol.

According to an exemplary embodiment of the present disclosure, the organic acid of the step (2) may be one or more selected from citric acid, malic acid, ascorbic acid, succinic acid, tartaric acid, lactic acid and acetic acid.

According to an exemplary embodiment of the present disclosure, the acid treatment of the step (2) may be performed at pH 2.0-4.5.

According to an exemplary embodiment of the present disclosure, the sum of the gypenoside L and the gypenoside LI may be 10-100 mg/g.

According to an exemplary embodiment of the present disclosure, the *Gynostemma pentaphyllum* leaf extract may contain 6-60 mg/g of the gypenoside L and 4-40 mg/g of the gypenoside LI.

According to an exemplary embodiment of the present disclosure, the *Gynostemma pentaphyllum* leaf extract may further contain 4-10 parts by weight of ginsenoside Rg3 based on 100 parts by weight of the gypenoside L and the gypenoside LI.

According to an exemplary embodiment of the present disclosure, the *Gynostemma pentaphyllum* leaf extract may improve one or more exercise performance capacity selected from muscle strength and endurance.

According to an exemplary embodiment of the present disclosure, the *Gynostemma pentaphyllum* leaf extract may increase muscle mass or inhibit muscle loss.

The present disclosure also provides a *Gynostemma pentaphyllum* leaf extract prepared by the method described above, which contains gypenoside L and gypenoside LI at a weight ratio of 100:20-80, wherein the sum of the gypenoside L and the gypenoside LI is 10-100 mg/g.

The present disclosure also provides a food composition for improving exercise performance capacity, which contains the *Gynostemma pentaphyllum* leaf extract as an active ingredient.

The present disclosure also provides a pharmaceutical composition for improving exercise performance capacity, which contains the *Gynostemma pentaphyllum* leaf extract as an active ingredient.

According to an exemplary embodiment of the present disclosure, the improvement of exercise performance capacity may be prevention or treatment of one or more disease caused by declined exercise capacity selected from degenerative disease, mitochondrial disease, declined endurance, declined promptness, lethargy, muscle wasting and depression.

The present disclosure also provides a food composition for preventing or alleviating a muscular disease caused by declined muscular function, muscular wasting or muscular atrophy or muscle damage, which contains the *Gynostemma pentaphyllum* leaf extract as an active ingredient.

According to an exemplary embodiment of the present disclosure, the muscular disease may be one or more selected from atony, muscular atrophy, muscular dystrophy, myasthenia, cachexia and sarcopenia.

According to an exemplary embodiment of the present disclosure, the muscle damage may be one or more selected from muscle strain, muscle rupture, muscle tearing, contusion, sprain, rotator cuff syndrome and myositis.

The present disclosure also provides a food composition for reducing body weight and body fat, which contains the *Gynostemma pentaphyllum* leaf extract as an active ingredient.

The present disclosure also provides a food composition for preventing or alleviating diabetes, which contains the *Gynostemma pentaphyllum* leaf extract as an active ingredient.

The *Gynostemma pentaphyllum* leaf extract according to the present disclosure exhibits superior effect of improving exercise performance capacity and enhancing muscle strength, endurance and physical strength. In addition, since the *Gynostemma pentaphyllum* leaf extract according to the present disclosure exhibits the effect of increasing AMPK activity, promoting beta oxidation, promoting glucose uptake, etc., it has superior effect in reducing body weight and body fat and preventing or treating diabetes.

Because the composition of the present disclosure is derived from a natural product, it can be used usefully and safely for drugs, foods, etc. without side effects.

DETAILED DESCRIPTION

Figure 1:
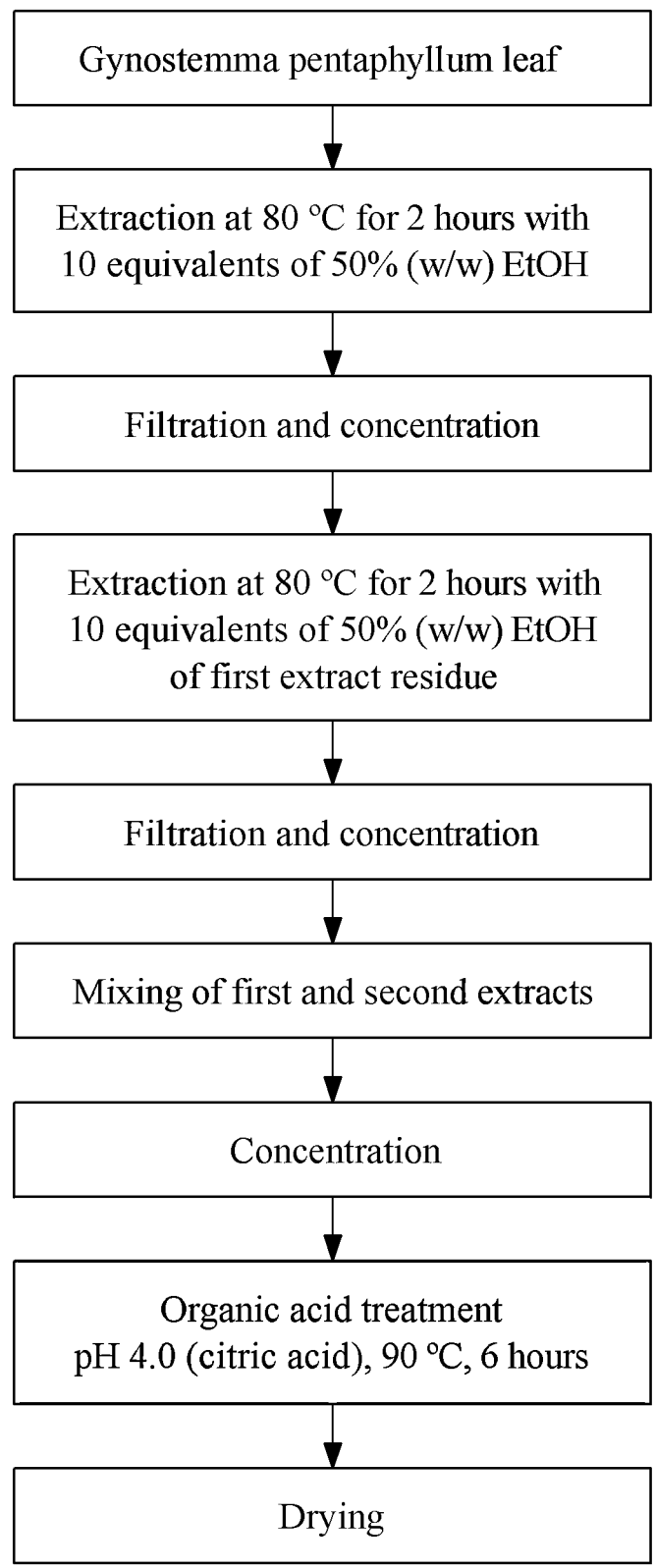
FIG. 1 is a process chart illustrating a method for preparing a *Gynostemma pentaphyllum* leaf extract according to an exemplary embodiment of the present disclosure.

*Gynostemma pentaphyllum* is a perennial vine belonging to the family Cucurbitaceae. It grows wildly in the forests of mountains or fields. It has rhizomes extending sideways and has white furs. It grows entangled but also climbs with tendrils. It grows wild in the mountains of the southern parts of Korea, Jeju Island and Ulleungdo. Outside Korea, it is distributed widely in China, Japan, Southeast Asia, etc. It grows mostly in moist areas such as shores, riversides, etc.

There are several species in the genus *Gynostemma* that grow in different countries and regions. About 30 species are known in the genus *Gynostemma* and they are known to have significant difference in ingredients and their contents depending on habitats. Especially, the *pentaphyllum* species is distributed widely and its ingredients and their effects have been studied extensively. *Gynostemma pentaphyllum* contains various saponins known as gynosaponins or gypenosides. The gypenosides have chemical structures similar to those of ginseng ginsenosides except for the moieties at which OH groups are bonded. Due to high saponin contents of *Gynostemma pentaphyllum*, *Gynostemma pentaphyllum* leaf has been widely used as a nourishing tonic instead of ginseng.

It is known that the saponins of *Gynostemma pentaphyllum* exhibit the effect of improving lipid metabolism, preventing cardiovascular diseases, lowering blood sugar, acting on the central nervous system, fighting against cancer, inhibiting platelet aggregation, providing tonicity, etc. In addition, *Gynostemma pentaphyllum* contains, in addition to gypenosides which are saponins, glycosides such as primeverosides, sophorosides, bisdesmosides, gentiobiosides, rutinosides, etc. as well as steroids, sugars, pigments, etc.

In the present specification, the "gypenoside" refers to a triterpenoid saponin.

In the present specification, the "exercise performance capacity" or "exercise capacity" refers to the ability of performing physical activities in everyday lives or sports, such as running, jumping, throwing, swimming, etc., fast, strongly, accurately, long and proficiently. The exercise performance capacity is defined by such factors as muscle strength, sense of balance, motor coordination, agility, endurance, etc. The term "improvement of exercise performance capacity" refers to the improvement or enhancement of exercise performance capacity, specifically to the improvement or enhancement of endurance, sense of balance or muscle strength.

Specifically, the improvement of exercise performance capacity may be achieved through the growth and differentiation of muscle cells, increased muscle mass or increased mitochondrial biosynthesis.

Meanwhile, the various mechanisms of reducing fat accumulation in the body include a mechanism whereby body fat is regulated by facilitating the oxidation of fat ingested from food or body fat accumulated in the body. The transport of fatty acids to mitochondria is enhanced by increasing the activity of enzymes involved in the oxidation of fatty acids and, accordingly, beta oxidation in the mitochondria is promoted and energy production from fat is increased.

Specifically, in energy consumption in the body, the burning process of producing energy and heat by directly degrading or oxidizing accumulated fat is important. Various enzymes and genes are involved in this process. In particular, it is reported that AMPK plays an important role in fat oxidation.

The phosphorylation of ACC through activation of AMPK is important in the reduction of body fat via increased fatty acid oxidation. Accordingly, by regulating the activity of the enzyme ACC during the initial stage of fatty acid synthesis with AMPK, unnecessary fat accumulation in the body can be prevented and, as a result, the increase in body weight can be prevented. That is to say, if AMPK is activated, fat synthesis is decreased and beta oxidation is increased at the same time. As a result, body fat is decreased and, thus, body weight is decreased.

Hereinafter, the present disclosure is described in detail.

The present disclosure relates to a method for preparing a *Gynostemma pentaphyllum* leaf extract containing gypenoside L and gypenoside LI at a weight ratio of 100:20-80, which includes: (1) a step of preparing a *Gynostemma pentaphyllum* leaf extract by extracting dried *Gynostemma pentaphyllum* leaf with water, a $C_1$-$C_4$ lower alcohol or a mixed solvent thereof; and (2) a step of adding an organic acid to the *Gynostemma pentaphyllum* leaf extract and then conducting acid treatment at 60-100° C.

The inventors of the present disclosure have consistently researched on a method for preparing a *Gynostemma pentaphyllum* leaf extract effective in improving exercise performance capacity. In doing so, they have identified that a *Gynostemma pentaphyllum* leaf extract prepared by a method including: (1) a step of preparing a *Gynostemma pentaphyllum* leaf extract by extracting dried *Gynostemma pentaphyllum* leaf with water, a $C_1$-$C_4$ lower alcohol or a mixed solvent thereof; and (2) a step of adding an organic acid to the *Gynostemma pentaphyllum* leaf extract and then conducting acid treatment at 60-100° C. has a remarkable effect of improving exercise performance capacity and preventing, alleviating or treating a muscular disease or muscle damage, and have completed the present disclosure.

First, in the step (1), a *Gynostemma pentaphyllum* leaf extract is prepared by extracting dried *Gynostemma pentaphyllum* leaf with water, a $C_1$-$C_4$ lower alcohol or a mixed solvent thereof.

The step (1) may include: (a) a step of preparing a *Gynostemma pentaphyllum* leaf extract by extracting *Gynostemma pentaphyllum* leaf with water, a $C_1$-$C_4$ lower alcohol or a mixed solvent thereof; (b) a step of preparing an extract of a *Gynostemma pentaphyllum* leaf extract residue by extracting a residue remaining after the extraction of the *Gynostemma pentaphyllum* leaf with water, a $C_1$-$C_4$ lower alcohol or a mixed solvent thereof; and (c) a step of mixing the extract of the step (a) and the extract of the step (b).

After the extract of the step (a) and the extract of the step (b) are mixed, the mixture may be filtered and concentrated.

Specifically, impurities may be removed from the mixture of the extract of the step (a) and the extract of the step (b) using a common filtration method or apparatus. For example, an extract with impurities removed may be obtained by centrifugation or filtration using a microfilter.

In addition, the filtered *Gynostemma pentaphyllum* leaf extract may be concentrated. Specifically, the filtered *Gynostemma pentaphyllum* leaf extract may be concentrated to 10-30 Brix.

The dried *Gynostemma pentaphyllum* leaf in the step (1) refers to *Gynostemma pentaphyllum* leaf which has been dried, and includes naturally dried *Gynostemma pentaphyllum* leaf, semi-dried *Gynostemma pentaphyllum* leaf, *Gynostemma pentaphyllum* leaf that has been roasted or steamed and then dried, etc.

Specifically, the *Gynostemma pentaphyllum* leaf may be obtained by roasting or steaming fresh *Gynostemma pentaphyllum* leaf at 90-300° C. for 5 minutes to 120 hours and then dried.

Because the precursors of the active ingredients of *Gynostemma pentaphyllum* leaf are mostly glycosides, it is expected in principle that the contents of the active ingredients will be increased upon heating as the bonds of the sugar or lipid leaf contained in the *Gynostemma pentaphyllum* leaf are broken. In addition, through heat treatment such as roasting, the change of the ingredients with time can be minimized as the degradative enzymes contained in the *Gynostemma pentaphyllum* leaf are deactivated.

In general, roasting refers to heat treatment of fresh leaf in an open container above a given temperature. It is a process commonly used to prevent deterioration by killing harmful bacteria and improve storability, flavor and taste by deactivating the degradative enzymes remaining in fresh leaf. If the roasting is conducted at high temperature, the conversion rate from the precursors to the active ingredients may be inconstant due to excessive benzopyrene production. In addition, because of water loss, the conversion rate to effective low-molecular-weight saponins may be decreased.

Accordingly, in the present disclosure, the roasting or steaming may be performed at 90-300° C., specifically 90-200° C., more specifically 90-150° C., for 20 minutes to 120 hours, specifically 30 minutes to 30 hours, more specifically 1-10 hours. When the roasting or steaming is performed within the above temperature ranges, the production of benzopyrenes may be reduced while preventing the loss of the active ingredients contained in the *Gynostemma pentaphyllum* leaf.

In addition, the heat treatment such as roasting or steaming may be more specifically roasting in terms of the decreased content of benzopyrenes and increased content of the active ingredients. The roasting may be performed using wood fire, gas flame, an electric heater, etc., although not being specially limited thereto. For the roasting using wood fire, the *Gynostemma pentaphyllum* leaf may be roasted in a pot heated with wood fire. For the roasting using gas flame, the *Gynostemma pentaphyllum* leaf may be roasted in a pot heated with moderate gas flame. For the roasting using an electric heater, the *Gynostemma pentaphyllum* leaf may be roasted in a rotating-disc type electric heater. Among them, the roasting using an electric heater is preferred in terms of the decreased content of benzopyrenes and increased content of the active ingredients.

If the *Gynostemma pentaphyllum* leaf is naturally dried only without being roasted, the conversion from glycoside saponins to effective low-molecular-weight saponins may be hardly achieved.

The inventors of the present disclosure have found out that the heat treatment such as roasting should be conducted for fresh leaf in order to maximize the content of effective low-molecular-weight saponins in the *Gynostemma pentaphyllum* leaf. In addition, they have presumed based on the relationship between saponin precursors and effective low-molecular-weight saponins (Chen et al., *J. Chromatogr. B Analyt Technol Biomed Life Sci*, 969: pp. 42-52) that total saponins can be maintained by deactivating the enzymes that degrade saponins by roasting fresh *Gynostemma pentaphyllum* leaf and they can be converted to effective low-molecular-weight saponins through heat treatment at high temperature.

The dried *Gynostemma pentaphyllum* leaf may have a water content of 0.01-70 wt %, specifically 0.02-50 wt %, more specifically 0.03-15 wt %.

The *Gynostemma pentaphyllum* leaf extract of the present disclosure may be prepared by mixing the *Gynostemma pentaphyllum* leaf with an extraction solvent at a volume ratio of 1:1-100, specifically 1:1-50, more specifically 1:5-20, more specifically 1:5-15 and conducting extraction at 50-95° C., specifically 60-90° C., more specifically 70-90° C., for 0.5-10 hours, specifically 1-5 hours, more specifically 1-3 hours.

If the extraction temperature is below the lower limit, the extraction yield of the active ingredients may decrease. And, if it exceeds the upper limit, problems may occur during the process due to the vapor of the solvent.

In addition, if the extraction time is shorter than the lower limit, the extraction yield of the active ingredients may decrease.

The extraction solvent is water, a $C_1$-$C_4$ lower alcohol or a mixed solvent thereof. The mixed solvent may be 20-80 vol %, specifically 50-80 vol %, methanol, ethanol, butanol or propanol.

The extraction solvent may be 50-80 vol % ethanol in terms of the improvement of exercise performance capacity by the extract, although not being specially limited thereto.

Next, in the step (2), an organic acid is added to the *Gynostemma pentaphyllum* leaf extract and acid treatment is performed at 60-100° C.

The effect of improving exercise performance capacity of the *Gynostemma pentaphyllum* leaf extract of the present disclosure is maximized as the *Gynostemma pentaphyllum* leaf extract obtained in the step (1) is acid-treated under the above temperature condition.

The acid treatment temperature may be performed at 60-100° C., specifically 75-95° C., more specifically 80-95° C., more specifically 80-90° C. If the acid treatment temperature is below the lower limit, the yield of the active ingredients may decrease. And, if it exceeds the upper limit, the effect of improving exercise performance capacity of the *Gynostemma pentaphyllum* leaf extract is decreased remarkably as the active ingredients related with the exercise performance capacity in the *Gynostemma pentaphyllum* leaf extract are degraded at high temperature.

In addition, the acid treatment time may be 2-10 hours, specifically 4-8 hours, more specifically 6-8 hours. If the acid treatment time is shorter than the lower limit, the yield of the active ingredients may decrease. And, if it exceeds the upper limit, the effect of improving exercise performance capacity of the *Gynostemma pentaphyllum* leaf extract may decrease on the contrary as the active ingredients related with the exercise performance capacity in the *Gynostemma pentaphyllum* leaf extract are degraded.

The organic acid may be one or more selected from citric acid, malic acid, ascorbic acid, succinic acid, tartaric acid, lactic acid and acetic acid, specifically one or more selected from citric acid, succinic acid and tartaric acid, more specifically citric acid.

In addition, the acid treatment may be performed at pH 2.0-4.5, specifically pH 2.5-4.5, more specifically pH 3.5-4.5.

Within the above-described pH ranges, the effect of improving exercise performance capacity of the *Gynostemma pentaphyllum* leaf extract is maximized. Outside the above ranges, the effect of improving exercise performance capacity of the *Gynostemma pentaphyllum* leaf extract is decreased.

After the acid treatment step, a step of neutralizing to pH 6.0 or higher, specifically pH 6.0-7.5, more specifically pH 6.0-7.0, using an alkaline solution may be further added.

The alkaline solution may be one in which one or more alkaline hydroxide (OH) compound selected from a group consisting of sodium hydroxide, sodium bicarbonate, calcium hydroxide, potassium hydroxide, magnesium hydroxide and ammonia water in distilled water to a concentration of 0.01-2% (w/v).

It was confirmed that the *Gynostemma pentaphyllum* leaf extract prepared through the acid treatment has better effect of improving exercise performance capacity, preventing, alleviating or treating a muscular disease or muscle damage, and reducing body weight and body fat as compared to the *Gynostemma pentaphyllum* leaf extract obtained through extraction at high temperature of 100° C. or higher and/or high pressure.

In the *Gynostemma pentaphyllum* leaf extract prepared according to the method of the present disclosure, the gypenoside L is a compound represented by Chemical Formula 1.

[Chemical Formula 1]

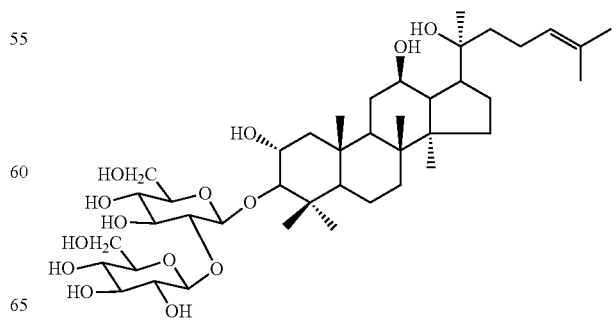

In addition, the gypenoside LI, which is a diastereomer of the gypenoside L, is a compound represented by Chemical Formula 2.

[Chemical Formula 2]

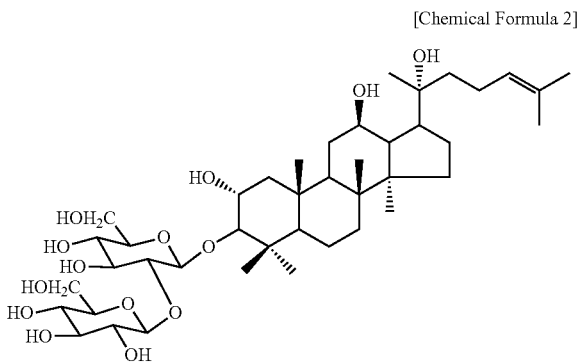

The gypenoside L and the gypenoside LI may be contained in the *Gynostemma pentaphyllum* leaf extract at a weight ratio of 100:20-80, specifically 100:30-70, more specifically 100:50-70.

When the weight ratio of the gypenoside LI to the gypenoside L is within the above ranges, the effect of improving exercise performance capacity of the *Gynostemma pentaphyllum* leaf extract according to the present disclosure is maximized. If the weight ratio of the gypenoside LI to the gypenoside L is below the lower limit, the effect of improving exercise performance capacity of the *Gynostemma pentaphyllum* leaf extract is slight. And, if it exceeds the upper limit, the effect of improving exercise performance capacity of the *Gynostemma pentaphyllum* leaf extract is decreased on the contrary.

The sum of the gypenoside L and the gypenoside LI contained in the *Gynostemma pentaphyllum* leaf extract of the present disclosure may be 10-100 mg/g, specifically 10-50 mg/g, more specifically 13-40 mg/g. When the sum of the gypenoside L and the gypenoside LI contained in the *Gynostemma pentaphyllum* leaf extract is within the above ranges, the effect of improving exercise performance capacity of the *Gynostemma pentaphyllum* leaf extract is maximized. If the sum of the gypenoside L and the gypenoside LI contained in the *Gynostemma pentaphyllum* leaf extract is below the lower limit, the effect of improving exercise performance capacity of the *Gynostemma pentaphyllum* leaf extract is slight. And, if it exceeds the upper limit, the effect of improving exercise performance capacity of the *Gynostemma pentaphyllum* leaf extract may decrease on the contrary.

The *Gynostemma pentaphyllum* leaf extract of the present disclosure may contain 6-60 mg/g, specifically 8-50 mg/g, more specifically 10-30 mg/g, of the gypenoside L and may contain 4-40 mg/g, specifically 5-15 mg/g, of the gypenoside LI. When the contents of the gypenoside L and the gypenoside LI in the *Gynostemma pentaphyllum* leaf extract are within the above ranges, the effect of improving exercise performance capacity of the *Gynostemma pentaphyllum* leaf extract may be maximized.

In addition, the *Gynostemma pentaphyllum* leaf extract of the present disclosure may further contain 4-10 parts by weight of Rg3 based on 100 parts by weight of the gypenoside L and the gypenoside LI.

When the weight ratio of Rg3 based on the sum of the gypenoside L and the gypenoside LI in the *Gynostemma pentaphyllum* leaf extract is within the above range, the effect of improving exercise performance capacity of the *Gynostemma pentaphyllum* leaf extract is increased further. If the weight ratio of Rg3 based on the gypenoside L and the gypenoside LI is below the lower limit, the effect of improving exercise performance capacity of the *Gynostemma pentaphyllum* leaf extract may decrease.

The *Gynostemma pentaphyllum* leaf extract may also be prepared into a concentrate or a dry powder. Specifically, the filtered *Gynostemma pentaphyllum* leaf extract may be concentrated to 60-70 Brix. Alternatively, the *Gynostemma pentaphyllum* leaf extract may be prepared into a powder through an additional process such as vacuum drying, freeze-drying, spray drying, etc.

In addition, the present disclosure relates to a *Gynostemma pentaphyllum* leaf extract which is prepared by the method described above and contains gypenoside L and gypenoside LI at a weight ratio of 100:20-80, wherein the sum of the gypenoside L and the gypenoside LI is 10-100 mg/g.

The *Gynostemma pentaphyllum* leaf extract of the present disclosure, which contains gypenoside L and gypenoside LI at a weight ratio of 100:20-80, specifically 100:30-70, more specifically 100:50-70, has very superior effect of improving exercise performance capacity. If the weight ratio of the gypenoside LI to the gypenoside L is below the lower limit, the effect of improving exercise performance capacity of the *Gynostemma pentaphyllum* leaf extract is slight. And, if it exceeds the upper limit, the effect of improving exercise performance capacity of the *Gynostemma pentaphyllum* leaf extract decreases remarkably on the contrary.

In addition, the sum of the gypenoside L and the gypenoside LI contained in the *Gynostemma pentaphyllum* leaf extract of the present disclosure may be 10-100 mg/g, specifically 10-50 mg/g, more specifically 13-40 mg/g, more specifically 13-30 mg/g, specifically 15-30 mg/g. When the sum of gypenoside L and gypenoside LI contained in the *Gynostemma pentaphyllum* leaf extract is within the above ranges, the effect of improving exercise performance capacity of the *Gynostemma pentaphyllum* leaf extract is maximized. If the sum of gypenoside L and gypenoside LI contained in the *Gynostemma pentaphyllum* leaf extract is below the lower limit, the effect of improving exercise performance capacity of the *Gynostemma pentaphyllum* leaf extract is slight. And, if it exceeds the upper limit, the effect of improving exercise performance capacity of the *Gynostemma pentaphyllum* leaf extract may decrease on the contrary.

The *Gynostemma pentaphyllum* leaf extract of the present disclosure is effective in improving one or more exercise performance capacity selected from muscle strength and endurance, increasing muscle mass, inhibiting muscle loss, or reducing body fat.

In addition, the present disclosure provides a food composition for improving exercise performance capacity, which contains the *Gynostemma pentaphyllum* leaf extract as an active ingredient.

In the present specification, the term "containing as an active ingredient" means that the *Gynostemma pentaphyllum* leaf extract is contained in an amount sufficient to achieve the desired efficacy or activity. A daily administration dosage of the *Gynostemma pentaphyllum* leaf extract of the present disclosure may be 100-2000 mg/kg, specifically 100-1000 mg/kg, more specifically 200-800 mg/kg, more specifically 200-600 mg/kg. If the administration dosage of the *Gynostemma pentaphyllum* leaf extract of the present disclosure is below the lower limit, the effect of improving exercise performance capacity may not be achieved as desired. And, if it exceeds the upper limit, the effect of improving exercise performance capacity may not increase as much as the administration dosage is increased. Because the *Gynostemma pentaphyllum* leaf extract is a natural product and has no side effect on the human body even when it is administered in excess amount, the upper limit of the content of the *Gynostemma pentaphyllum* leaf extract in the composition of the present disclosure may be adequately determined by those skilled in the art.

The food composition of the present disclosure includes all types such as a functional food, a functional health food, a nutritional supplement, a health food, a food additive, etc. The food compositions of various types can be prepared into various forms according to common methods known in the art.

In the present disclosure, the food composition may be a functional health food composition.

The term "functional health food" used in the present disclosure refers to a food prepared or processed using raw materials or ingredients that possess the functionality useful for the human body according to the Functional Health Food Act No. 6727, and the term 'functionality' means gaining useful effect for health purposes through adjustment of nutrients or physiological actions for the structure and function of the human body.

The functional health food composition may be formulated into one selected from a group consisting of a tablet, a pill, a dust, a granule, a powder, a capsule and a liquid using one or more of a carrier, a diluent, an excipient and an additive.

In addition, as a specific example of the food composition, the *Gynostemma pentaphyllum* leaf extract of the present disclosure may be prepared into a tea, a juice, a drink, etc. for drinking. In addition, the *Gynostemma pentaphyllum* leaf extract of the present disclosure may be prepared into a composition by mixing with a substance or an active ingredient known to have the effect of improving exercise performance capacity, increasing muscle mass or inhibiting muscle loss. For example, the food composition of the present disclosure may contain, in addition to the *Gynostemma pentaphyllum* leaf extract, trace amounts of minerals, vitamins, sugars and ingredients known to have the effect of improving exercise performance capacity, increasing muscle mass or inhibiting muscle loss.

The *Gynostemma pentaphyllum* leaf extract of the present disclosure may be added to a food or used together with another food or food ingredients according to a common method. The mixing amount of the active ingredient may be determined adequately depending on the purpose of use (prevention or alleviation). In general, the food composition may be added to a food in an amount of 0.001-100 wt %, specifically wt %, more specifically 0.1-30 wt %, of the total food weight. However, for long-term use for the purpose of improvement of exercise performance capacity or health care, the amount may be below the above ranges. In addition, the active ingredient may be used in an amount above the above ranges because there is no problem in terms of safety.

In addition, the present disclosure relates to a pharmaceutical composition for improving exercise performance capacity, which contains the *Gynostemma pentaphyllum* leaf extract as an active ingredient.

The pharmaceutical composition for improving exercise performance capacity of the present disclosure may be used to prevent or treat a disease caused by declined exercise capacity. The disease may be, for example, a degenerative disease, a mitochondrial disease, declined endurance, declined promptness, lethargy, muscle wasting, depression, etc. The composition of the present disclosure has the effect of improving exercise performance capacity, regardless of the type and kind of exercise.

The pharmaceutical composition may further contain a pharmaceutically acceptable carrier. The pharmaceutically acceptable carrier may be one commonly used for formulation, including saline, sterile water, Ringer's solution, buffered saline, cyclodextrin, dextrose solution, maltodextrin solution, glycerol, ethanol, liposome, etc. If necessary, another common additive such as an antioxidant, a buffer, etc. may be further contained. In addition, an aqueous solution, a suspension, an emulsion, etc. may be formulated by additionally adding a diluent, a dispersant, a surfactant, a binder, a lubricant, etc.

The formulation of the pharmaceutical composition may be a granule, a powder, a tablet, a coated tablet, a capsule, a suppository, a liquid, a syrup, a juice, a suspension, an emulsion, a medicinal drop, an injectable liquid, etc. although not being specially limited thereto. For example, for formulation into a tablet or a capsule, the active ingredient may be used together with an oral, nontoxic, pharmaceutically acceptable inert carrier such as ethanol, glycerol, water, etc. In addition, if desired or necessary, a suitable binder, lubricant, disintegrant or colorant may be included. The suitable binder includes starch, gelatin, a natural sugar such as glucose or p-lactose, corn sweetener, a natural or synthetic gum such as acacia, tragacanth or sodium oleate, sodium stearate, magnesium stearate, sodium benzoate, sodium acetate, sodium chloride, etc. The disintegrant may be starch, methyl cellulose, agar, bentonite, xanthan gum, etc. although not being limited thereto.

For formulation into a liquid solution, the composition may be mixed with one or more of saline, sterile water, Ringer's solution, buffered saline, albumin injection solution, dextrose solution, maltodextrin solution, glycerol and ethanol as a sterilized, physiologically and pharmaceutically acceptable carrier. If necessary, another common additive such as an antioxidant, a buffer, a bacteriostat, etc. may be added. In addition, an injectable formulation such as an aqueous solution, a suspension, an emulsion, etc., a pill, a capsule, a granule or a tablet may be prepared by further adding a diluent, a dispersant, a surfactant, a binder or a lubricant.

Specifically, suitable formulations may be prepared depending on the particular disease or ingredients using the methods described in Remington's Pharmaceutical Science (Mack Publishing Company, Easton PA).

The pharmaceutical composition of the present disclosure may be administered orally or parenterally. The parenteral administration may be made by intravenous injection, subcutaneous injection, intramuscular injection, intraperitoneal injection, transdermal administration, etc. Specifically, the composition may be administered orally.

An appropriate administration dosage of the pharmaceutical composition of the present disclosure varies depending on such factors as formulation method, administration mode, the age, body weight, sex, pathological condition and diet of a patient, administration time, administration route, excretion rate and response sensitivity, and an ordinarily skilled physician can easily determine and prescribe an administration dosage effective for the desired treatment or prevention. According to a specific exemplary embodiment of the present disclosure, a daily administration dosage of the pharmaceutical composition of the present disclosure may be 0.001-10 g/kg. To achieve the desired effect, the *Gynostemma pentaphyllum* leaf extract of the present disclosure may be administered 1-3 times a day at an effective dosage of 0.001-400 mg/kg, specifically 0.01-100 mg/kg. The administration dosage does not limit the scope of the present disclosure by any means.

In addition, the present disclosure relates to a food composition for preventing or alleviating a muscular disease caused by declined muscular function, muscular wasting or muscular atrophy, or muscle damage, which contains the *Gynostemma pentaphyllum* leaf extract as an active ingredient. The composition of the present disclosure is effective in increasing muscle mass regardless of muscle type.

The description of the terms "*Gynostemma pentaphyllum* leaf extract", "food composition" and "functional health food composition" which have been described above will be omitted to avoid unnecessary redundancy.

The muscular disease may be one or more selected from atony, muscular atrophy, muscular dystrophy, myasthenia, cachexia and sarcopenia.

The "atony" refers to the condition of myotonic dystrophy.

The "muscular atrophy" refers to the loss of muscular tissues or damage to neurons that regulate muscles, and includes both gradual muscular atrophy and muscle weakness. In general, disuse of muscles often proceeds gradually to muscular atrophy due to severe decrease in muscle strength. In addition, living in gravity-free environment or decreased calcium often leads to decreased muscle strength.

In addition, muscular atrophy caused by the disease of muscles may include myasthenia gravis, Duchene type, Becker type, limb-girdle type, facioscapulohumeral type, inflammation occurring in muscles, etc., and muscular atrophy caused by damage to neurons that regulate muscles may include spinal muscular atrophy such as Werdnig-Hoffman disease and Kugelberg-Welander disease, amyotrophic lateral sclerosis (ALS) such as Lou Gehrig's disease and spinobular muscular atrophy such as Kennedy's disease.

The "muscular dystrophy" is a degenerative muscular disease characterized by necrosis of muscle fibers. Necrosis and degeneration of muscle fibers caused by damage to the sarcolemma lead to decreased muscle strength and muscular atrophy. It includes Duchenne muscular dystrophy, Becker muscular dystrophy, limb-girdle muscular dystrophy, Emery-Dreifuss muscular dystrophy, facioscapulohumeral muscular dystrophy, myotonic muscular dystrophy, oculopharyngeal muscular dystrophy, distal muscular dystrophy, congenital muscular dystrophy, etc. and may occur in various forms depending on parts.

The "myasthenia" is a disease characterized by muscle weakness due to muscular neuropathy. In the early stage, mild symptoms occur such as eyelid drooping (ptosis) and restricted movement of pupils. In addition, speech may be slurred and swallowing may be difficult. Besides, facial muscles are weakened. If the symptoms of myasthenia worsen, the patient finds it difficult to lift heavy objects and falls easily because of restricted limb movements. In addition, crises such as difficulty in breathing or respiratory paralysis may occur.

The "cachexia" refers to a condition of systemic atrophy. It is caused by malignant tumors, Basedow's disease, hypopituitarism, malaria, hypoadrenocorticism, cacothymia, etc. Major clinical symptoms are general weakness, anemia and edema. It is known that anemia of malignant tumors results in topical malnutrition and causes host metabolic disorder by competing with the host metabolism, leading to cachexia.

In addition, the muscular wasting or muscular atrophy is caused by innate or acquired factors, aging, etc., and may include the gradual loss of muscle mass, weakening and degeneration of muscles, particularly skeletal or voluntary muscles and cardiac muscles, and decrease in muscle strength resulting therefrom.

The "decrease in muscle strength" refers to a condition where the strength of one or more muscles is decreased. The weakening of the muscle strength may be restricted to one muscle, a part of the body, upper or lower limbs, etc., and may also occur throughout the body. In addition, the subjective symptoms of decreased muscle strength including muscle fatigue or muscle pain may be quantified objectively through medical examination. The cause of decreased muscle strength may include muscle damage, decreased muscle mass due to decreased expression of muscle cells, etc., muscle aging, etc., although not being limited thereto.

In the present disclosure, the "muscle damage" may refer to any damage caused by physical or chemical destruction due to injury.

Specifically, the muscle damage may be one or more selected from muscle strain, muscle rupture, muscle tearing, contusion, sprain, rotator cuff syndrome and myositis.

Decline in muscle cell function, imbalance of energy metabolism, etc. may lead to muscle damage together with decline in muscular function, lethargy, etc.

If the muscle damage continues, it progresses to a muscular disease and causes muscle loss, muscular atrophy, muscular atrophy, etc. If the muscular disease is not treated properly, it may progress into a chronic disease and cause severe health problems. In addition, it may be associated with a metabolic disease.

In an example of the present disclosure, it was identified that the *Gynostemma pentaphyllum* leaf extract of the present disclosure not only increases energy production in muscles but also promotes the proliferation of muscle cells, suggesting that it can exhibit therapeutic effect for muscular diseases and muscle damage through proliferation and growth of muscle cells.

In addition, the present disclosure relates to a food composition for reducing body weight and body fat, which contains the *Gynostemma pentaphyllum* leaf extract as an active ingredient. The composition of the present disclosure is effective in reducing body weight and body fat by increasing beta oxidation.

The description of the terms "*Gynostemma pentaphyllum* leaf extract", "food composition" and "functional health food composition" which have been described above will be omitted to avoid unnecessary redundancy.

Hereinafter, the *Gynostemma pentaphyllum* leaf extract according to the present disclosure will be described in detail through examples.

EXAMPLES

Preliminary Test 1: *Gynostemma Pentaphyllum* Leaf Ethanol Extract—Analysis of Contents of Active Ingredients (1) After adding 1 L of 50% (v/v) ethanol to 100 g of *Gynostemma pentaphyllum* leaf, which had been roasted at 135° C. for 2 hours and then dried, and conducting extraction at 80° C. for 2 hours, the supernatant was recovered.

(2) After adding 1 L of 50% (v/v) ethanol to the *Gynostemma pentaphyllum* leaf extract residue remaining after the extraction, and conducting extraction at 90° C. for 2 hours, the supernatant was recovered.

(3) The *Gynostemma pentaphyllum* leaf ethanol extract of the step (1) and the *Gynostemma pentaphyllum* leaf extract residue extract of the step (2) were mixed and then filtered.

After concentrating the filtrate under reduced pressure to a solid content of 20-25%, a *Gynostemma pentaphyllum* leaf extract was prepared by freeze-drying the same.

The active ingredients of the prepared *Gynostemma pentaphyllum* leaf extract was analyzed by HPLC under the condition described in Table 1, and the analysis result is given in Table 2.

200 mg of the *Gynostemma pentaphyllum* leaf extract was dissolved in 5 mL of 50% (v/v) MeOH and used for HPLC analysis.

For the HPLC analysis, gypenoside L (Gyp L, purity 99.42%) purchased from Shanghai Yuanye Bio-Technology (China), gypenoside LI (Gyp LI, purity 99.33%) purchased from Korea Research Institute of Bioscience and Biotechnology and ginsenoside Rg3 (purity 98.24%) purchased from Ambo (Korea) were used as standards.

TABLE 1

| Detector | DAD or PDA (204 nm) | | |
|---|---|---|---|
| Column | ZORBAX Eclipse Plus C18 | | |
| Flow rate | 1.0 mL/min | | |
| Injection volume | 10 μL | | |
| Mobile phase | Solvent A: DW, Solvent B: Acetonitrile | | |
| | Time (min) | Solvent A (%) | Solvent B (%) |
| | 0 | 60 | 40 |
| | 20 | 60 | 40 |
| | 35 | 50 | 50 |
| | 40 | 50 | 50 |
| | 40.1 | 0 | 100 |
| | 50 | 0 | 100 |
| | 50.1 | 60 | 40 |
| | 60 | 60 | 40 |

TABLE 2

| pH (10% solution) | Gyp L (mg/g) | Gyp LI (mg/g) | Gyp L:Gyp LI | Ginsenoside Rg3 (mg/g) |
|---|---|---|---|---|
| 5.65 | 0.52 | N/D | — | N/D |

Preliminary Test 2

*Gynostemma Pentaphyllum* Leaf Ethanol Extract→Acid Treatment with Citric Acid and Change in Contents of Active Ingredients Depending on pH After diluting the *Gynostemma pentaphyllum* leaf extract of Preliminary test 1 to a solid content of 40% and adjusting to pH 3.0, 4.0, or 5.0 by adding citric acid, or without adding citric acid, a *Gynostemma pentaphyllum* leaf extract was prepared by conducting acid treatment at 90° C. and 100 rpm for 4 hours.

The prepared *Gynostemma pentaphyllum* leaf extract was analyzed by HPLC according to the condition and method described in Preliminary test 1, and the measured contents of the active ingredients are given in Table 3.

TABLE 3

| | Gyp L (mg/g) | Gyp LI (mg/g) | Gyp L:Gyp LI | Rg3 (mg/g) |
|---|---|---|---|---|
| Untreated (pH 5.65) | 1.20 | N/D | — | N/D |
| pH 3.0 | 12.63 | 8.83 | 100:69.91 | 1.21 |

TABLE 3-continued

| | Gyp L (mg/g) | Gyp LI (mg/g) | Gyp L:Gyp LI | Rg3 (mg/g) |
|---|---|---|---|---|
| pH 4.0 | 15.36 | 9.78 | 100:63.67 | 1.68 |
| pH 5.0 | 2.46 | 1.25 | 100:50.81 | N/D |

From Table 3, it can be seen that the contents of the active ingredients were increased when acid treatment was conducted as compared to the *Gynostemma pentaphyllum* leaf ethanol extract which was not acid-treated. In particular, the contents of the active ingredients were increased remarkably when the pH was adjusted to 3.0-4.0.

Preliminary Test 3

*Gynostemma Pentaphyllum* Leaf Ethanol Extract→Acid Treatment with Citric Acid and Change in Contents of Active Ingredients Depending on Acid Treatment Temperature After diluting the *Gynostemma pentaphyllum* leaf extract of Preliminary test 1 to a solid content of 40% and adjusting to pH 4.0 by adding citric acid, a *Gynostemma pentaphyllum* leaf extract was prepared by conducting acid treatment at 60, 70, 80, 90 or 100° C. and 100 rpm for 4 hours.

The prepared *Gynostemma pentaphyllum* leaf extract was analyzed by HPLC according to the condition and method described in Preliminary test 1, and the measured contents of the active ingredients are given in Table 4.

TABLE 4

| Temperature (° C.) | Gyp L (mg/g) | Gyp LI (mg/g) | Gyp L:Gyp LI | Rg3 (mg/g) |
|---|---|---|---|---|
| 60 | 1.96 | 0.98 | 100:50.00 | N/D |
| 70 | 4.65 | 2.70 | 100:58.06 | N/D |
| 80 | 12.36 | 7.75 | 100:62.70 | 0.78 |
| 90 | 15.50 | 10.30 | 100:66.45 | 1.52 |
| 100 | 15.47 | 12.05 | 100:77.89 | 1.76 |
| 121 | 16.12 | 14.36 | 100:89.08 | 1.82 |

From Table 4, it can be seen that the *Gynostemma pentaphyllum* leaf ethanol extracts acid-treated at 80-90° C. showed remarkably increased contents of the active ingredients as compared to the *Gynostemma pentaphyllum* leaf extracts acid-treated at different temperatures and had a weight ratio of gypenoside LI to gypenoside L in a range of 100:20-80.

When the acid treatment temperature was 121° C., the contents of the active ingredients of the *Gynostemma pentaphyllum* leaf extract were increased remarkably but the weight ratio of gypenoside LI to gypenoside L was outside the range of 100:20-80.

Preliminary Test 4

*Gynostemma Pentaphyllum* Leaf Ethanol Extract→Acid Treatment and Change in Contents of Active Ingredients Depending on Organic Acids After diluting the *Gynostemma pentaphyllum* leaf extract of Preliminary test 1 to a solid content of 40% and adjusting to pH 4.0 by adding citric acid, succinic acid, tartaric acid, malic acid or ascorbic acid, a *Gynostemma pentaphyllum* leaf extract was prepared by conducting acid treatment at 90° C. and 100 rpm for 4 hours.

The prepared *Gynostemma pentaphyllum* leaf extract was analyzed by HPLC according to the condition and method described in Preliminary test 1, and the measured contents of the active ingredients are given in Table 5.

TABLE 5

| Organic acids | Gyp L (mg/g) | Gyp LI (mg/g) | Gyp L:Gyp LI | Rg3 (mg/g) |
|---|---|---|---|---|
| Untreated | 0.52 | N/D | — | N/D |
| Citric acid | 15.66 | 9.34 | 100:59.64 | 1.34 |
| Succinic acid | 10.65 | 5.69 | 100:53.42 | 0.88 |
| Tartaric acid | 10.15 | 5.30 | 100:52.21 | 0.78 |
| Malic acid | 9.99 | 5.09 | 100:50.95 | 0.78 |
| Ascorbic acid | 9.13 | 4.85 | 100:53.12 | 0.69 |

From Table 5, it can be seen that the *Gynostemma pentaphyllum* leaf ethanol extract acid-treated using citric acid has remarkably increased contents of the active ingredients of the *Gynostemma pentaphyllum* leaf extract as compared to other organic acids.

Preliminary Test 5

*Gynostemma Pentaphyllum* Leaf Ethanol Extract→Acid Treatment and Change in Contents of Active Ingredients Depending on Acid Treatment Time After diluting the *Gynostemma pentaphyllum* leaf extract of Preliminary test 1 to a solid content of 40% and adjusting to pH 4.0 by adding citric acid, a *Gynostemma pentaphyllum* leaf extract was prepared by conducting acid treatment at 90° C. and 200 rpm for 0, 2, 4, 6 or 8 hours (FIG. 1).

The prepared *Gynostemma pentaphyllum* leaf extract was analyzed by HPLC according to the condition and method described in Preliminary test 1, and the measured contents of the active ingredients are given in Table 6.

TABLE 6

| Acid treatment time (hr) | Gyp L (mg/g) | Gyp LI (mg/g) | Gyp L:Gyp LI | Rg3 (mg/g) |
|---|---|---|---|---|
| 0 | 0.52 | N/D | — | 0.36 |
| 2 | 9.33 | 5.71 | 100:61.20 | 0.66 |
| 4 | 10.93 | 6.75 | 100:61.76 | 1.15 |
| 6 | 15.49 | 9.87 | 100:63.71 | 1.39 |
| 8 | 15.30 | 9.42 | 100:61.56 | 1.21 |

From Table 6, it can be seen that the *Gynostemma pentaphyllum* leaf ethanol extracts acid-treated for 3 hours or longer, specifically 4 hours or longer, more specifically 6 hours or longer, had remarkably increased contents of the active ingredients of the *Gynostemma pentaphyllum* leaf extract.

Example 1: Preparation of *Gynostemma Pentaphyllum* Leaf Extract-Citric Acid (1) After adding 1 L of 50% (v/v) ethanol to 100 g of *Gynostemma pentaphyllum* leaf, which had been roasted for at 135° C. for 2 hours and then dried, and conducting extraction at 80° C. for 2 hours, the supernatant was recovered.

(2) After adding 1 L of 50% (v/v) ethanol to the *Gynostemma pentaphyllum* leaf extract residue remaining after the extraction and then conducting extraction at 90° C. for 2 hours, the supernatant was recovered.

(3) The *Gynostemma pentaphyllum* leaf ethanol extract of the step (1) and the *Gynostemma pentaphyllum* leaf extract residue extract of the step (2) were mixed at a volume ratio of 1:1 and then filtered. A *Gynostemma pentaphyllum* leaf extract was prepared by concentrating the filtrate to a solid content of 20-25% under reduced pressure.

(4) After concentrating the *Gynostemma pentaphyllum* leaf extract to a solid content of 40% under reduced pressure and adjusting pH to 4.0 by adding citric acid, acid treatment was conducted at 9° C. and 100 rpm for 6 hours. After cooling for 10 minutes and neutralizing with 1 M NaOH, a *Gynostemma pentaphyllum* leaf extract was prepared by freeze-drying the same.

Example 2: Use of Malic Acid

A *Gynostemma pentaphyllum* leaf extract was prepared in the same manner as in Example 1, except that malic acid was added instead of citric acid in the step (4).

Comparative Example 1: *Gynostemma Pentaphyllum* Leaf Ethanol Extract

A *Gynostemma pentaphyllum* leaf ethanol extract was prepared in the same manner as in Preliminary test 1.

Comparative Example 2: Acid Treatment at 121° C.

A *Gynostemma pentaphyllum* leaf extract was prepared in the same manner as in Example 1, except that the acid treatment in the step (4) was conducted at 121° C. for 4 hours instead at 90° C. for 6 hours.

Comparative Example 3: *Gynostemma Pentaphyllum* Leaf Ethanol Extract→Treatment at High Temperature and High Pressure A *Gynostemma pentaphyllum* leaf extract was prepared according to the method for preparing a *Gynostemma pentaphyllum* leaf extract described in Korean Patent Registration No. 10-0930580 (Example 1).

Specifically, after roasting 100 g of *Gynostemma pentaphyllum* fresh leaf at 135° C. for 2 hours and then drying the same, 1 L of 50% ethanol was added and first extraction was conducted at 90° C. for 6 hours and then a first supernatant was recovered. After adding 1 L of 50% ethanol to the remaining *Gynostemma pentaphyllum* leaf extract residue, a second supernatant was obtained by conducting extraction at 90° C. for 6 hours.

After mixing the first supernatant and the second supernatant and filtering the mixture with gauze, the filtrate was concentrated at 60° C. under reduced pressure to a solid content of 50%. A *Gynostemma pentaphyllum* leaf extract was prepared by heat-treating the concentrate at 121° C. and 1.2 atm for 1 hour and then freeze-drying the same.

Comparative Example 4: Hot Water Extraction of *Gynostemma Pentaphyllum* Leaf at High Temperature and High Pressure After roasting 100 g of *Gynostemma pentaphyllum* fresh leaf at 135° C. for 2 hours and drying the same, 1 L of water was added. After immersion for 1 hour and conducting extraction at 135° C. and 1.2 atm for 4 hours, a first hot water extract was obtained by recovering the supernatant. After adding 1 L of water to the remaining *Gynostemma pentaphyllum* leaf extract residue and conducting extraction at 135° C. and 1.2 atm for 4 hours, a second hot water extract was obtained by recovering the supernatant.

After mixing the first and second hot water extracts and filtering the mixture, a *Gynostemma pentaphyllum* leaf extract was prepared by concentrating the obtained filtrate at 60° C. under reduced pressure and then freeze-drying the same.

Comparative Example 5: Steaming of *Gynostemma Pentaphyllum* Leaf→Hot Water Extraction at High Temperature and High Pressure with Water of pH 4

A *Gynostemma pentaphyllum* leaf extract was prepared according to the method for preparing a *Gynostemma pentaphyllum* leaf extract described in Korean Patent Registration No. 10-1969062 (Example 2).

(1) *Gynostemma pentaphyllum* leaf which had been roasted at 135° C. for 2 hours using an electric heater and then dried was steam-treated at 121° C. for 60 minutes. After adding 1 L of water (pH was adjusted to 4 using hydrochloric acid and sodium bicarbonate) to 100 g of the steam-treated *Gynostemma pentaphyllum* leaf and immersing for 1 hour, a hot water extract was prepared by conducting extraction at 121° C. and 1.2 atm for 4 hours and then recovering the supernatant.

(2) After adding 1 L of 50 vol % ethanol to the 100 g of the residue remaining after the hot water extraction of the *Gynostemma pentaphyllum* leaf and conducting extraction at 80° C. for 3 hours, an alcohol extract was obtained by recovering the supernatant.

(3) After mixing the hot water extract of the step (1) and the alcohol extract of the step (2) at a volume ratio 1:1 and then filtering the same, a *Gynostemma pentaphyllum* leaf extract was prepared by concentrating under reduced pressure to a solid content of 20-25 wt % and then freeze-drying the same.

TEST EXAMPLES

In Test Examples, all measurements were repeated 3 times and the result was expressed as mean±standard deviation. Statistical analysis was performed using the SPSS software (ver. 20.0, SPSS Inc., Chicago, IL, USA). The difference between groups was examined by one-way analysis of variance (ANOVA). P<0.05 was regarded as significant. In the data, *,  and * indicate significant difference from a control group or a normal group with p<0.05, p<0.01 and p<0.001, respectively (Student's t-test), and #, ## and ### indicate significant difference from a negative control group or a muscular atrophy group with p<0.05, p<0.01 and p<0.001, respectively (Student's t-test).

Test Example 1: Analysis of Contents of Active Ingredients

The HPLC result for the *Gynostemma pentaphyllum* leaf extracts of Examples and Comparative Examples according to the condition and method described in Preliminary test 1 is shown in Table 7.

TABLE 7

| | Gyp L (mg/g) | Gyp LI (mg/g) | Gyp L:Gyp LI | Gyp L + Gyp LI (mg/g) | Rg3 (mg/g) |
|---|---|---|---|---|---|
| Example 1 | 15.49 | 9.87 | 100:63.72 | 25.36 | 1.39 |
| Example 2 | 9.99 | 5.09 | 100:50.95 | 15.08 | 0.78 |

TABLE 7-continued

| | Gyp L (mg/g) | Gyp LI (mg/g) | Gyp L:Gyp LI | Gyp L + Gyp LI (mg/g) | Rg3 (mg/g) |
|---|---|---|---|---|---|
| Comparative Example 1 | 0.52 | N/D | — | 0.52 | N/D |
| Comparative Example 2 | 16.12 | 14.36 | 100:89.08 | 30.48 | 1.82 |
| Comparative Example 3 | 4.50 | 3.10 | 100:68.89 | 7.60 | 0.25 |
| Comparative Example 4 | 3.20 | 1.50 | 100:46.88 | 4.70 | 1.50 |
| Comparative Example 5 | 41.31 | 39.65 | 100:95.98 | 80.96 | 4.01 |

From Table 7, it can be seen that the *Gynostemma pentaphyllum* leaf extracts of Examples according to the present disclosure have a weight ratio of gypenoside L (Gyp L) and gypenoside LI (Gyp LI) in a range of 100:20-80 and the sum of gypenoside L (Gyp L) and gypenoside LI (Gyp LI) is 10.0 mg/g or higher.

In contrast, for Comparative Example 1, the content of gypenoside LI (Gyp LI) was below the limit of detection or very low.

In addition, for Comparative Example 2 and Comparative Example 5, the sum of gypenoside L (Gyp L) and gypenoside LI (Gyp LI) was 10.0 mg/g or higher but the weight ratio of gypenoside L (Gyp L) and gypenoside LI (Gyp LI) was well over 100:80.

For Comparative Example 3 and Comparative Example 4, the weight ratio of gypenoside L (Gyp L) and gypenoside LI (Gyp LI) was within the range of 100:20-80 but the sum of gypenoside L (Gyp L) and gypenoside LI (Gyp LI) was below 10.0 mg/g.

Test Example 2: Activation of Myogenesis by *Gynostemma Pentaphyllum* Leaf Extract It is known that the mTOR protein can induce the activation of the protein involved in the synthesis of muscle proteins and increase of muscle mass in the PI3K/Akt signaling pathway in muscle cells when activated by phosphorylation. Therefore, in order to identify the induction of myogenesis by the *Gynostemma pentaphyllum* leaf ethanol extract, the activity of mTOR was investigated using an mTOR sandwich ELISA kit (Cell Signaling Technology, Beverly, MA, USA).

L6 myoblasts (ATCC; Manassas, VA, USA) were seeded onto a 6-well plate at 1×10$^5$ cell/mL and cultured for 24 hours in Dulbecco's modified Eagle's medium (DMEM; Hyclone) containing 10% fetal bovine serum (FBS; Hyclone, Logan, UT, USA). After the culturing, the medium was removed from the well and replaced with DMEM (Hyclone) containing 2% horse serum (HS; Hyclone). Then, the L6 cells were differentiated into myotubes by culturing further for 6 days. Subsequently, the cells were treated with the *Gynostemma pentaphyllum* leaf extract of Examples or Comparative Examples at a concentration of 40 μg/mL and cultured for 12 hours. After the culturing, the cells were lysed by treating with a cell lysis buffer. After quantifying proteins in the obtained cell lysate by the Bradford assay (Bio-Rad Laboratories Inc., Hercules, CA, USA), 50 μL of the cell lysate was transferred at a concentration of 1 mg/mL to a microwell to which the anti-mTOR antibody was attached and then incubated at 37° C. for 2 hours. After the incubation, the cell lysate was washed for a total of 4 times with a washing buffer and then incubated at 37° C. for 1 hour after treating with a detection antibody. After washing a total of 4 times with a washing buffer and adding a HRP (horseradish peroxidase)-conjugated secondary antibody, incubation was conducted at 37° C. for 30 minutes. Finally, after washing for a total of 4 times with a washing buffer and adding the TMB substrate to each well, incubation was conducted at 37° C. for 10 minutes and then the TBM reaction was stopped by adding a stop buffer. 2 minutes later, the mTOR level in the myotubes treated with the *Gynostemma pentaphyllum* leaf extract was determined by measuring absorbance at 450 nm. The result is shown in Table 8.

TABLE 8

|  | Relative mTOR activity (% of control group) |
| --- | --- |
| Control group | 100 |
| Example 1 | 172.6 ± 13.4*** |
| Example 2 | 154.3 ± 14.8** |
| Comparative Example 1 | 121.6 ± 11.2 |
| Comparative Example 2 | 122.3 ± 10.3 |
| Comparative Example 3 | 113.1 ± 6.4 |
| Comparative Example 4 | 117.4 ± 12.8 |
| Comparative Example 5 | 137.4 ± 10.5* |

From Table 8, it can be seen that the activity of mTOR was increased significantly in the L6 muscle cells treated with the *Gynostemma pentaphyllum* leaf extracts of Examples according to the present disclosure. This means that the *Gynostemma pentaphyllum* leaf extract of the present disclosure has superior ability of increasing myogenesis in muscle cells.

Test Example 3: Inhibition of Degradation of Muscle Proteins by *Gynostemma Pentaphyllum* Leaf Extract L6 myoblasts (ATCC) were seeded onto a 6-well plate at $2\times10^5$ cell/mL and then cultured in DMEM (Hyclone) containing 10% FBS (Hyclone). When the cell density reached about 80-85%, the L6 cells were differentiated into myotubes by removing the medium from the well and replacing with DMEM (Hyclone) containing 2% HS (Hyclone). The differentiation was conducted for a total of 6 days while replacing with a fresh medium every other day. After the differentiation, the *Gynostemma pentaphyllum* leaf extract of Examples or Comparative Example was dissolved in DMEM containing 50 ng/mL of TNF-α to a concentration of 40 μg/mL and treated to the cells. 6 hours later, total RNAs were isolated using a TRIzol reagent (Takara, Osaka, Japan). The isolated total RNAs were quantified using NanoDrop 1000 (Thermo Fisher Scientific Inc., Waltham, MA, USA). 16 μL of the quantified RNAs were mixed with a reverse transcriptase premix (ELPIS-Biotech) and cDNAs were synthesized under the condition of 55 minutes at 42° C. and 15 minutes at 70° C. using a PCR machine (Gene Amp PCR System 2700; Applied Biosystems, Foster City, CA, USA). After preparing a PCR sample by mixing 4 μL of the synthesized cDNAs with forward and reverse primer pairs described in Table 9 (Bioneer, Deajeon, Korea) and a PCR premix (ELPIS-Biotech), PCR was conducted by repeating 30 cycles of 30 seconds at 95° C., 1 minute at 60° C. and 1 minute at 72° C.

The cDNAs amplified from the PCR were separated by electrophoresis on 1.5% agarose gel and cDNA bands were identified using the G:BOX EF imaging system (Syngene). The result is shown in Table 10.

TABLE 9

| Amplified genes | Name | Direction | Sequence | SEQ ID NO |
| --- | --- | --- | --- | --- |
| Atrogin-1 | Atrogin_F | Forward | 5'-GTCCAGA GAGTCGGCAA GTC-3' | SEQ ID NO 1 |
| Atrogin-1 | Atrogin_R | Reverse | 5'-GTCGGTG ATCGTGAGAC CTT-3' | SEQ ID NO 2 |
| MuRF-1 | MuRF_F | Forward | 5'-TCTACTC GGCCACAGGC GCT-3' | SEQ ID NO 3 |
| MuRF-1 | MuRF_R | Reverse | 5'-CTTGACA GCTCCCGCCG CAA-3' | SEQ ID NO 4 |

TABLE 10

|  | MuRF-1 (% of control group) | Atrogin-1 (% of control group) |
| --- | --- | --- |
| Control group | 100 | 100 |
| TNF-α (50 ng/ml) | 411.5 ± 32.7*** | 248.5 ± 26.4** |
| Example 1 | 125.0 ± 11.6### | 109.0 ± 10.3### |
| Example 2 | 156.5 ± 12.8### | 121.2 ± 9.6### |
| Comparative Example 1 | 329.2 ± 24.3# | 198.8 ± 16.7# |
| Comparative Example 2 | 312.3 ± 23.1# | 184.3 ± 12.3# |
| Comparative Example 3 | 373.4 ± 22.6# | 204.6 ± 17.2# |
| Comparative Example 4 | 349.2 ± 21.8# | 193.2 ± 19.5# |
| Comparative Example 5 | 256.9 ± 16.7## | 151.6 ± 11.4## |

From Table 10, it can be seen that the treatment with the *Gynostemma pentaphyllum* leaf extracts of Examples according to the present disclosure leads to decreased expression of atrogin-1 and MuRF-1 mRNAs in the L6 muscle cells. This means that the *Gynostemma pentaphyllum* leaf extract of the present disclosure has superior ability of inhibiting the degradation of muscle proteins in muscle cells.

Test Example 4: Facilitation of Muscle Differentiation by *Gynostemma Pentaphyllum* Leaf Extract L6 myoblasts (ATCC) were seeded onto a 6-well plate at $2\times10^5$ cell/mL and cultured in DMEM (Hyclone) containing 10% FBS (Hyclone). When the cell density reached about 80-85%, the medium was removed from the well and differentiation into myotubes was induced by treating the cells with the *Gynostemma pentaphyllum* leaf extract of Examples or Comparative Examples dissolved in DMEM (Hyclone) containing 2% HS to a concentration of 40 μg/mL. A control group was treated with 0.01% DMSO instead of the sample. After differentiation for a total of 6 days by repeating this process 3 times for 2 days each, total RNAs were isolated using a TRIzol reagent (Takara). After synthesizing cDNAs from the isolated RNAs according to the same method as in Test Example 3, the transcription level of MyoD and myogenin mRNAs was identified by conducting PCR. The sequences of the primers (Bioneer) used for the PCR are described in Table 11. The cDNAs amplified from the PCR were separated by electrophoresis on 1.5% agarose gel and cDNA bands were identified using the G:BOX EF imaging system (Syngene). The result is shown in Table 12.

TABLE 11

| Amplified genes | Name | Direction | Sequence | SEQ ID NO |
|---|---|---|---|---|
| MyoD | MyoD_F | Forward | 5'-GGATGGTGCCCTGGGTCCT-3' | SEQ ID NO 7 |
| MyoD | MyoD_R | Reverse | 5'-TGGCCTTCGCTGTGAGTCGC-3' | SEQ ID NO 8 |
| Myogenin | Myogenin_F | Forward | 5'-TGGGCTGCCACAAGCCAGAC-3' | SEQ ID NO 9 |
| Myogenin | Myogenin_R | Reverse | 5'-CAGCCCAGCCACTGGCATCA-3' | SEQ ID NO 10 |
| β-Actin | Actin_F | Forward | 5'-CTGTGTGGATTGGTGGCTCTAT-3' | SEQ ID NO 5 |
| β-Actin | Actin_R | Reverse | 5'-GTGTAAAACGCAGCTCAGTAACA-3' | SEQ ID NO 6 |

TABLE 12

| | MyoD (% of control group) | Myogenin (% of control group) |
|---|---|---|
| Control group | 100 | 100 |
| Example 1 | 373.8 ± 42.4*** | 623.7 ± 29.3*** |
| Example 2 | 323.4 ± 31.6*** | 472.8 ± 33.7*** |
| Comparative Example 1 | 169.6 ± 26.3* | 212.1 ± 19.4* |
| Comparative Example 2 | 183.2 ± 24.6* | 270.3 ± 32.6* |
| Comparative Example 3 | 172.4 ± 15.8* | 258.6 ± 26.4* |
| Comparative Example 4 | 157.3 ± 19.1* | 249.3 ± 16.7* |
| Comparative Example 5 | 223.6 ± 24.7* | 317.5 ± 34.5 ** |

From Table 12, it can be seen that the treatment with the *Gynostemma pentaphyllum* leaf extracts of Examples according to the present disclosure results in remarkably increased expression of MyoD and myogenin mRNAs in the L6 muscle cells. This means that the *Gynostemma pentaphyllum* leaf extract of the present disclosure has superior ability of facilitating muscle differentiation in muscle cells.

Test Example 5: Improvement of Exercise Performance Capacity by *Gynostemma Pentaphyllum* Leaf Extract In order to evaluate the exercise performance capacity of the *Gynostemma pentaphyllum* leaf extract, PGC-1α activity was investigated by luciferase assay. COS7 monkey kidney cells (ATCC) were cultured on a 24-well plate at $1.5 \times 10^5$ cells/well and then a pGL3-PGC-1α-Luc plasmid (Addgene, Cambridge, MA, USA) was transfected into the cells using Lipofector (Aptabio, Yongin, Korea). 4 hours later, the cells were stabilized for 24 hours. Then, the cells were treated with the *Gynostemma pentaphyllum* leaf extract of Examples or Comparative Examples dissolved in DMEM to a concentration of 40 μg/mL for 24 hours. 24 hours later, the cells were lysed with an NP-40 buffer (ELPIS-Biotech) and the activity of luciferase in the cell lysate was measured. The result is shown in Table 13.

TABLE 13

| | Relative luciferase activity (% of control group) |
|---|---|
| Control group | 100 |
| Example 1 | 162.4 ± 14.7*** |
| Example 2 | 145.3 ± 11.6** |
| Comparative Example 1 | 104.2 ± 9.4 |
| Comparative Example 2 | 109.5 ± 12.3 |
| Comparative Example 3 | 111.6 ± 12.1 |
| Comparative Example 4 | 108.4 ± 6.9 |
| Comparative Example 5 | 121.3 ± 10.5* |

From Table 13, it can be seen that the *Gynostemma pentaphyllum* leaf extracts of Examples according to the present disclosure remarkably increase the activity of PGC-1α, which is a major factor involved in exercise performance capacity. This means that the *Gynostemma pentaphyllum* leaf extract of the present disclosure has superior ability of enhancing exercise performance capacity.

Test Example 6: Facilitation of Mitochondrial Biosynthesis by *Gynostemma Pentaphyllum* Leaf Extract Experiment was conducted according to the same method as in Test Example 4. L6 cells were induced to differentiate into myotubes by treating with the *Gynostemma pentaphyllum* leaf extract Examples or Comparative Examples at a concentration of 40 μg/mL. A control group was treated with 0.01% DMSO instead of the sample. The sequences of the primers (Bioneer) used for the PCR are described in Table 14. The cDNAs amplified from the PCR were separated by electrophoresis on 1.5% agarose gel and cDNA bands were identified using the G:BOX EF imaging system (Syngene). The result is shown in Table 15.

TABLE 14

| Amplified genes | Name | Direction | Sequence | SEQ ID NO |
|---|---|---|---|---|
| PGC-1α | PGC_F | Forward | 5'-ATGTGTCGCCTTCTTGCTCT-3' | SEQ ID NO 11 |
| PGC-1α | PGC_R | Reverse | 5'-ATCTACTGCCTGGGGACCTT-3' | SEQ ID NO 12 |
| ERRα | ERR_F | Forward | 5'-AAGGGGATGGAGACCACAGT-3' | SEQ ID NO 13 |
| ERRα | ERR_R | Reverse | 5'-TGAGGTGGGAGCTGATAGGG-3' | SEQ ID NO 14 |
| NRF-1 | NRF_F | Forward | 5'-TGGACCCAAGCATTACGGAC-3' | SEQ ID NO 15 |
| NRF-1 | NRF_R | Reverse | 5'-GGTCATTTCACCGCCCTGTA-3' | SEQ ID NO 16 |

TABLE 14-continued

| Amplified genes | Name | Direction | Sequence | SEQ ID NO |
|---|---|---|---|---|
| Tfam | Tfam_F | Forward | 5'-GCTTCCAGGA GGCTAAGGAT-3' | SEQ ID NO 17 |
| Tfam | Tfam_R | Reverse | 5'-CCCAATCCC AATGACAACT C-3' | SEQ ID NO 18 |
| β-Actin | Actin_F | Forward | 5'-CTGTGTGGA TTGGTGGCTCTA T-3' | SEQ ID NO 5 |
| β-Actin | Actin_R | Reverse | 5'-GTGTAAAACGC AGCTCAGTAACA3' | SEQ ID NO 6 |

TABLE 15

| | PGC-1α (% of control group) | ERRα (% of control group) | NRF-1 (% of control group) | Tfam (% of control group) |
|---|---|---|---|---|
| control group | 100 | 100 | 100 | 100 |
| Example 1 | 169.4 ± 16.5*** | 131.6 ± 12.4** | 186.7 ± 15.8*** | 146.7 ± 11.6** |
| Example 2 | 151.3 ± 12.3** | 126.4 ± 11.0** | 161.3 ± 14.2** | 131.5 ± 12.4* |
| Comparative Example 1 | 106.4 ± 10.2 | 102.3 ± 10.6 | 113.1 ± 11.9 | 109.3 ± 11.2 |
| Comparative Example 2 | 111.6 ± 13.7 | 106.7 ± 9.4 | 117.2 ± 12.4 | 116.2 ± 10.8 |
| Comparative Example 3 | 114.1 ± 16.0 | 109.5 ± 11.3 | 115.4 ± 10.8 | 110.6 ± 13.4 |
| Comparative Example 4 | 110.2 ± 12.8 | 108.3 ± 8.1 | 122.6 ± 11.6 | 112.3 ± 9.5 |
| Comparative Example 5 | 125.4 ± 16.1* | 115.6 ± 10.9* | 131.7 ± 10.7* | 125.4 ± 11.8* |

From Table 15, it can be seen that the treatment with the *Gynostemma pentaphyllum* leaf extracts of Examples according to the present disclosure resulted in remarkably increased expression of the PGC-1α, ERRα, NRF-1 and Tfam mRNAs in the L6 muscle cells. This means that the *Gynostemma pentaphyllum* leaf extract of the present disclosure has superior effect of increasing the expression of the mitochondrial biosynthesis-associated genes, which are closely related with exercise performance capacity, in muscle cells.

Test Example 7: Effect of Improving Exercise Performance Capacity in Muscular Atrophy-Induced Animal Model 7-1: Animal Breeding and Induction of Muscular Atrophy 7-week-old male mice (C57BL/6N; Young Bio) were used as experimental animals. All the animals were housed in cages under the condition of 23±2° C. and 55±10% relative humidity. Prior to the beginning of experiments, a total of 40 mice were randomly divided into a normal group, a muscular atrophy group, an Example 1 administration group, a Comparative Example 1 administration group, a Comparative Example 2 administration group, a Comparative Example 3 administration group, a Comparative Example 4 administration group and a Comparative Example 5 administration group, with 5 mice per group. After accommodation for 1 week, the mice were anesthetized by intraperitoneally injecting 325 mg/kg of tribromoethanol (Sigma-Aldrich). After the anesthetization, the right hindlimb gastrocnemius muscle and the right footpad of the mice in the muscular atrophy group and the Example and Comparative Example administration groups were stapled using a skin stapler (Unidus, Chungcheongbuk-do, Korea) to damage the muscle and the right hindlimb was prevented from moving. This state was maintained for a week. One week later, the stables fixed to the gastrocnemius muscle and the footpad were removed, and recovery was induced by orally administering the *Gynostemma pentaphyllum* leaf extract of Examples or Comparative Examples at a concentration of 300 mg/kg every day for a week. The normal group and the muscular atrophy group were orally administered with saline instead of the sample.

7-2: Measurement of Muscle Strength

At the end of the oral administration, the muscle strength of the mice was measured using a muscle strength meter (Chatillon force measurement system; Columbus Instrument, Columbus, OH, USA). The tail of the mouse was pulled with constant force until the mouse released the bar of the muscle strength meter. A total of 5 tests were conducted consecutively per mouse, and the result is shown in Table 16.

TABLE 16

| | Muscle strength (g) |
|---|---|
| Normal group | 267.5 ± 12.7 |
| Muscular atrophy group | 191.4 ± 10.3** |
| Example 1 | 253.4 ± 15.6## |
| Comparative Example 1 | 190.5 ± 14.1 |
| Comparative Example 2 | 202.2 ± 8.4 |
| Comparative Example 3 | 204.3 ± 16.4 |
| Comparative Example 4 | 195.8 ± 5.9 |
| Comparative Example 5 | 206.1 ± 12.7 |

From Table 16, it can be seen that the, whereas the muscle strength was decreased significantly (**, $p<0.01$) in the muscular atrophy group as compared to the normal group, the muscle strength was increased significantly (##, $p<0.01$) when the *Gynostemma pentaphyllum* leaf extract of Example 1 according to the present disclosure was administered. This means that the *Gynostemma pentaphyllum* leaf extract of the present disclosure has superior effect of increasing muscle strength that has decreased due to muscular atrophy. Meanwhile, the *Gynostemma pentaphyllum* leaf extracts according to Comparative Examples 1-5 did not significantly increase the muscle strength.

7-3: Measurement of Endurance

The exercise performance capacity of the experimental animals was evaluated using a treadmill (LE8710MTS; Panlab, Barcelona, Spain). The speed was increased from 8 m/m in at a rate of 1 m/min. The treadmill was set to apply an electrical current of 0.2 mA when the mice mouse reached the shock grid. The experiment was stopped when the mouse did not run any longer even after receiving the electric shock for 10 seconds, and the time and distance were measured. The result is shown in Table 17.

TABLE 17

|  | Exercise time (sec) | Exercise distance (m) |
|---|---|---|
| Normal group | 1220.4 ± 125.2 | 342.1 ± 44.7 |
| Muscular atrophy group | 843.6 ± 92.3** | 213.5 ± 46.2** |
| Example 1 | 1194.2 ± 119.4## | 326.4 ± 47.3## |
| Comparative Example 1 | 864.2 ± 81.6 | 236.7 ± 34.6 |
| Comparative Example 2 | 872.1 ± 88.3 | 251.3 ± 29.7 |
| Comparative Example 3 | 892.3 ± 91.4 | 256.1 ± 33.4 |
| Comparative Example 4 | 912.5 ± 101.7 | 264.5 ± 41.3 |
| Comparative Example 5 | 1023.7 ± 127.8# | 283.2 ± 37.1# |

From Table 17, it can be seen that, whereas the exercise time and the exercise distance were decreased significantly (**, $p<0.01$) in the muscular atrophy group as compared to the normal group, the exercise time and the exercise distance were increased significantly (##, $p<0.01$) when the *Gynostemma pentaphyllum* leaf extract of Example 1 according to the present disclosure was administered. This means that the *Gynostemma pentaphyllum* leaf extract of the present disclosure has very superior effect of improving endurance that has decreased due to muscular atrophy.

7-4: Measurement of Muscle Weight

After the measurement of muscle strength and exercise performance capacity, the experimental animals were anesthetized by intraperitoneally injecting 325 mg/kg of tribromoethanol (Sigma-Aldrich) and then sacrificed via heart blood collection. After confirming that the heartbeat was stopped, the tibialis anterior muscle, which was not injured, was removed from the right hindlimb and weighed. The result is shown in Table 18.

TABLE 18

|  | Tibialis anterior muscle weight (g) |
|---|---|
| Normal group | 51.4 ± 3.8 |
| Muscular atrophy group | 37.4 ± 6.5** |
| Example 1 | 48.9 ± 5.7## |
| Comparative Example 1 | 38.1 ± 2.6 |
| Comparative Example 2 | 38.4 ± 5.1 |
| Comparative Example 3 | 37.9 ± 4.4 |
| Comparative Example 4 | 39.2 ± 3.2 |
| Comparative Example 5 | 41.6 ± 2.9 |

From Table 18, it can be seen that, whereas the muscle weight was decreased significantly (**, $p<0.01$) in the muscular atrophy group as compared to the normal group, the muscle weight was increased significantly (##, $p<0.01$) when the *Gynostemma pentaphyllum* leaf extract of Example 1 according to the present disclosure was administered. This means that the *Gynostemma pentaphyllum* leaf extract of the present disclosure has superior effect of increasing muscle mass that has decreased due to muscular atrophy.

Test Example 8: Decrease of Blood Sugar and Reduction of Body Fat by *Gynostemma Pentaphyllum* Leaf Extract

8-1: Facilitation of Glucose Uptake

After treating L6 muscle cells with the *Gynostemma pentaphyllum* leaf extract of Examples or Comparative Examples, the effect on intracellular glucose uptake was investigated. After seeding L6 cells onto a 96-well plate at $1 \times 10^4$ cells/m L, the cells were cultured for 24 hours. Then, cellular differentiation was induced by replacing the medium with one containing 2% FBS and culturing for 4 days. Then, after replacing with a medium containing the sample and culturing further for 2 hours, glucose uptake was measured using a glucose uptake colorimetric assay kit (Bio Vision).

As a result, glucose uptake was increased in the cells treated with the *Gynostemma pentaphyllum* leaf extract according to the present disclosure (Table 19). This result confirms that the *Gynostemma pentaphyllum* leaf extract according to the present disclosure has superior antidiabetic effect by lowering blood sugar.

TABLE 19

|  | Glucose uptake (% of control group) |
|---|---|
| Control group | 1.00 |
| Example 1 | 2.00 ± 0.07*** |
| Example 2 | 1.80 ± 0.06** |
| Comparative Example 3 | 1.75 ± 0.05* |
| Comparative Example 4 | 1.15 ± 0.12 |

8-2: Facilitation of Beta Oxidation

After treating L6 muscle cells with the *Gynostemma pentaphyllum* leaf extract of Examples or Comparative Examples, the effect on beta oxidation of fatty acids was investigated by the method of Hwang et al. (Hwang et al., *Biochem. Biophys. Res. Commun.* 377, 1253-1258).

As a result, the treatment with the *Gynostemma pentaphyllum* leaf extract according to the present disclosure resulted in the increase of beta oxidation. The result is shown in Table 20.

TABLE 20

|  | Beta oxidation (% of control group) |
|---|---|
| Control group | 100 |
| Example 1 | 188.2 ± 3.10*** |
| Example 2 | 165.4 ± 5.02** |
| Comparative Example 3 | 160.0 ± 2.00* |
| Comparative Example 4 | 104.3 ± 6.40 |

8-3: Increase of AMPK Phosphorylation

ACC is an important enzyme that regulates lipid metabolism in liver and muscle tissues. This enzyme carboxylates acetyl-CoA to produce malonyl-CoA. Malonyl-CoA is the most important factor in regulation of the beta oxidation of fatty acids in mitochondria. If the concentration of malonyl-CoA is increased, the activity of CPT-1 (carnitine palmitoyl-CoA transferase) in the mitochondrial membrane is decreased and the beta oxidation of fatty acids is inhibited. On the contrary, if the concentration of malonyl-CoA concentration is increased, beta oxidation is increased and, thus, the reduction of body fat is facilitated. ACC is a sub-target protein of the AMPK activity. The activation of AMPK facilitates the inactivation of the ACC enzyme through phosphorylation and thus decreases the concentration of malonyl-CoA. As a result, the activity of CPT-1 in the mitochondrial membrane is increased and the beta oxidation of fatty acids is increased.

Figure 2:
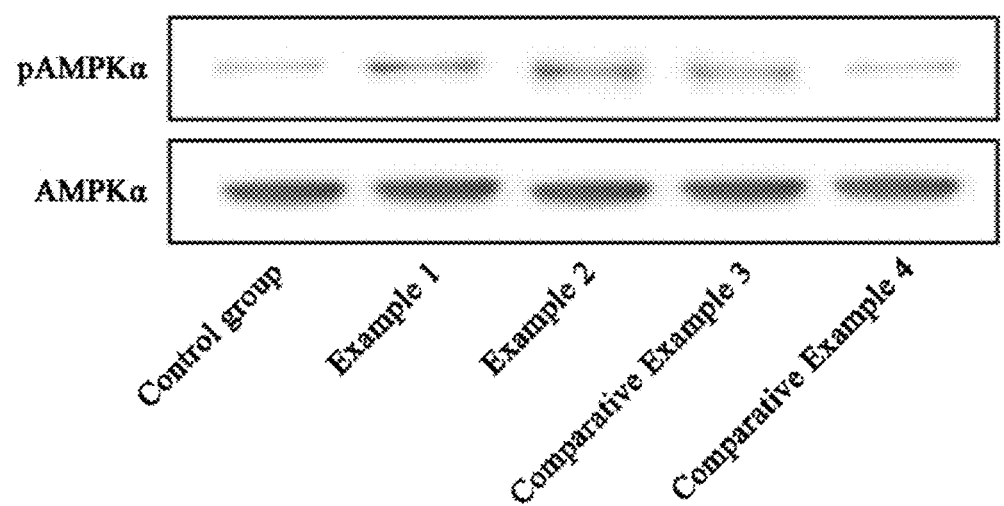
FIG. 2 is a western blot result showing increased AMPK phosphorylation by *Gynostemma pentaphyllum* leaf extracts according to Examples and Comparative Examples.

Therefore, the effect of the *Gynostemma pentaphyllum* leaf extract of Examples or Comparative Examples on the increase of AMPK phosphorylation was investigated. After treating differentiated L6 muscle cells (L6 myotube cells) with the *Gynostemma pentaphyllum* leaf extract for 2 hours, the increase of phosphorylation at the threonine-172 residue of the AMPK α subunit was identified by western blot assay according to Hwang et al.'s method (Hwang et al., *Biochem. Biophys. Res. Commun.* 371, 289-293, 2008). As a result, it was confirmed that the treatment with the *Gynostemma pentaphyllum* leaf extract resulted in increased AMPK phosphorylation in the L6 muscle cells as compared to a control group (see FIG. 2).

8-4: Reduction of Body Fat: In-Vivo Experiment

Experiment was conducted after accommodating specific pathogen-free male C57BL/6N mice for 1 week. Healthy animals were randomly divided into (G1) a control diet group, (G2) a high-fat diet control group, (G3) a high-fat diet+300 mg/kg body weight (BW) Example 1 administration group, and (G4) a high-fat diet+300 mg/kg BW Comparative Example 3 administration group, with 10 experimental animals per group. Through the test period, the control diet group (G1) and the high-fat diet groups (G2, G3, G4) were fed with a control food (energy ratio (kcal %); protein:carbohydrate:fat=20:70:10) and a high-fat diet (energy ratio (kcal %); protein:carbohydrate:fat=20:20:60) purchased from Research Diets, Inc. (New Brunswick, NJ, USA), respectively. Free access was allowed to the food and drinking water. The test substance was administered orally after dissolving in physiological saline for 8 weeks at constant hours (G3, G4). For G1 and G2, physiological saline not containing the test substance was administered orally. During the test period, the body weight of the experimental animals was measured every week at constant hours. The food intake of the experimental animals was measured every other day, and daily food intake and daily energy intake were calculated from the food intake during the test period. Food efficiency ratio (FER) was calculated by dividing the increase in body weight during the test period by food intake during the same period according to the following equation. The result is shown in Table 21.

Food efficiency ratio (FER)=increase in body weight (g)/food intake (g)   [Equation]

TABLE 21

| Diet | | Test substance (300 mg/ kg BW) | Body weight at week 8 (g) | Total increase in body weight (g) | Total food intake (g) | Food efficiency ratio (FER) |
|---|---|---|---|---|---|---|
| G1 | Control diet | — | 30.1 ± 0.4 | 8.7 ± 0.4 | 150.5 ± 0.7 | 0.0058 ± 0.002 |
| G2 | High-fat diet | — | 45.6. ± 0.6** | 24.1 ± 0.4*** | 130.6 ± 1.4** | 0.184 ± 0.003*** |

TABLE 21-continued

| Diet | | Test substance (300 mg/ kg BW) | Body weight at week 8 (g) | Total increase in body weight (g) | Total food intake (g) | Food efficiency ratio (FER) |
|---|---|---|---|---|---|---|
| G3 | High-fat diet | Example 1 | 37.3 ± 0.7## | 15.9 ± 0.7## | 115.8 ± 1.0## | 0.137 ± 0.006## |
| G4 | High-fat diet | Comparative Example 3 | 41.8 ± 0.4# | 20.1 ± 0.4# | 122.1 ± 0.9# | 0.164 ± 0.004# |

From Table 21, it can be seen that the increase in body weight was decreased significantly in the G3 group to which Example 1 of the present disclosure was administered as compared to the high-fat diet control group G2 or the G4 group to which Comparative Example 3 was administered.

PREPARATION EXAMPLES

Preparation Example 1: Preparation of Tablet

After mixing 8 mg of the *Gynostemma pentaphyllum* leaf extract of Example 1, 9 mg of vitamin E, 9 mg of vitamin C, 200 mg of galactooligosaccharide, 60 mg of lactose and 140 mg of maltose and granulating using a fluidized-bed dryer, 6 mg of sugar ester was added. 500 mg of the resulting composition was prepared into a tablet according to a common method.

Preparation Example 2: Preparation of Soft Capsule

A soft capsule was prepared according to a common method by mixing 8 mg of the *Gynostemma pentaphyllum* leaf extract of Example 1, 9 mg of vitamin C, 2 mg of palm oil, 8 mg of hydrogenated vegetable oil, 4 mg of yellow beeswax and 9 mg of lecithin and filling the mixture in a gelatin capsule.

Preparation Example 3: Preparation of Pill

A powder was obtained by pulverizing the *Gynostemma pentaphyllum* leaf extract of Example 1 and passing through a 200-mesh sieve. A pill was prepared by kneading 5 mg of the *Gynostemma pentaphyllum* leaf powder with honey, dextrin, starch, microcrystalline cellulose, CMC calcium, etc.

Preparation Example 4: Preparation of Drink

After mixing 20 mg of the *Gynostemma pentaphyllum* leaf extract of Example 1, 9 mg of vitamin E, 9 mg of vitamin C, 10 g of glucose, 0.6 g of citric acid and 25 g of oligosaccharide syrup, 300 mL of purified water was added. 200 mL of the mixture was filled in each bottle. Then, a drink was prepared by sterilizing the bottle at 130° C. for 4-5 seconds.

Preparation Example 5: Preparation of Granule

A granule was prepared by mixing 8 mg of the *Gynostemma pentaphyllum* leaf extract of Example 1, 9 mg of vitamin E, 9 mg of vitamin C, 250 mg of anhydrous crystalline glucose and 550 mg of starch, molding into a granule using a fluidized-bed granulator and then filling in a pouch.

Preparation Example 6: Preparation of Injection

| | |
|---|---|
| *Gynostemma pentaphyllum* leaf extract of Example 1 | 600 mg |
| Mannitol | 180 mg |
| Sterilized distilled water for injection | 2974 mg |
| Na$_2$HPO$_4$·12H$_2$O | 26 mg |

An injection was prepared by a common method with the composition described above.

Preparation Example 7: Preparation of Concentrated Tea

The *Gynostemma pentaphyllum* leaf extract of Example 1 was diluted to a solid content of 15% by adding water. After heating at 90° C., 10 parts by weight of γ-cyclodextrin was added based on 100 parts by weight of the *Gynostemma pentaphyllum* leaf extract. A concentrated tea was prepared by concentrating the mixture to 60%.

Preparation Example 8: Preparation of Functional Beverage

| | |
|---|---|
| *Gynostemma pentaphyllum* leaf extract of Example 1 | 1,000 mg |
| Citric acid | 1,000 mg |
| Oligosaccharide | 100 g |
| Plum concentrate | 2 g |
| Taurine | 1 g |
| Purified water | To 900 mL |

The above ingredients were mixed according to a common health drink preparation method and heated under stirring at 85° C. for about 1 hour. The prepared solution was filtered and transferred into a sterilized 2-L container. After sealing and sterilization, it was used for the preparation of a functional beverage composition.

The above-described composition is provided as a specific example suitable for a fancy drink. However, the composition can be changed as desired according to regional and ethnic preferences such as consumer class, country, purpose of use, etc.

Those having ordinary skill in the art to which the present disclosure belongs will understand from the above description that the present disclosure can be embodied into other specific forms without changing its technical idea or essential features. In this regard, the specific exemplary embodiments described above should be understood as exemplary, not limitative. It is to be understood that the scope of the present disclosure encompasses the meaning and scope of the appended claims and all changes or modifications derived from their equivalents.

What is claimed is:

1. A method for preparing a *Gynostemma pentaphyllum* leaf extract comprising gypenoside L and gypenoside LI at a weight ratio of gypenoside L to gypenoside LI of 100:20 to 100:80, which comprises:
   (1) a step of preparing a *Gynostemma pentaphyllum* leaf extract by extracting dried *Gynostemma pentaphyllum* leaf with water, a $C_1$ to $C_4$ lower alcohol, or a mixed solvent thereof; and
   (2) a step of adding an organic acid to the *Gynostemma pentaphyllum* leaf extract and then conducting acid treatment at 60 to 100° C.

2. The method for preparing a *Gynostemma pentaphyllum* leaf extract according to claim 1, wherein the step (1) comprises:
   (a) a step of preparing a *Gynostemma pentaphyllum* leaf extract by extracting *Gynostemma pentaphyllum* leaf with water, a $C_1$ to $C_4$ lower alcohol or a mixed solvent thereof;
   (b) a step of preparing an extract of a *Gynostemma pentaphyllum* leaf extract residue by extracting a residue remaining after the extraction of the *Gynostemma pentaphyllum* leaf with water, a $C_1$ to $C_4$ lower alcohol or a mixed solvent thereof; and
   (c) a step of mixing the extract of the step (a) and the extract of the step (b).

3. The method for preparing a *Gynostemma pentaphyllum* leaf extract according to claim 1, wherein the mixed solvent of the step (1) is 20 to 80 vol % of methanol, ethanol, butanol or propanol.

4. The method for preparing a *Gynostemma pentaphyllum* leaf extract according to claim 1, wherein the organic acid of the step (2) is one or more selected from citric acid, malic acid, ascorbic acid, succinic acid, tartaric acid, lactic acid and acetic acid.

5. The method for preparing a *Gynostemma pentaphyllum* leaf extract according to claim 1, wherein the acid treatment of the step (2) is performed at pH 2.0 to 4.5.

6. The method for preparing a *Gynostemma pentaphyllum* leaf extract according to claim 1, wherein the sum of the gypenoside L and the gypenoside LI is 10 to 100 mg/g.

7. The method for preparing a *Gynostemma pentaphyllum* leaf extract according to claim 1, wherein the *Gynostemma pentaphyllum* leaf extract comprises 6 to 60 mg/g of the gypenoside L and 4 to 40 mg/g of the gypenoside LI.

8. The method for preparing a *Gynostemma pentaphyllum* leaf extract according to claim 1, wherein the *Gynostemma pentaphyllum* leaf extract further comprises 4 to 10 parts by weight of ginsenoside Rg3 based on 100 parts by weight of the gypenoside L and the gypenoside LI.

9. The method for preparing a *Gynostemma pentaphyllum* leaf extract according to claim 1, wherein the *Gynostemma pentaphyllum* leaf extract improves one or more exercise performance capacity selected from muscle strength and endurance, or wherein the *Gynostemma pentaphyllum* leaf extract increases muscle mass or inhibits muscle loss.

10. A *Gynostemma pentaphyllum* leaf extract prepared by the method according to claim 1, which comprises gypenoside L and gypenoside LI at a weight ratio of gypenoside L to gypenoside LI of 100:20 to 100:80, wherein the sum of the gypenoside L and the gypenoside LI is 10 to 100 mg/g.

11. A composition for improving exercise performance capacity, comprising the *Gynostemma pentaphyllum* leaf extract according to claim 10 as an active ingredient.

12. The composition according to claim 11, wherein the improving exercise performance capacity is treatment of one or more disease caused by declined exercise capacity selected from degenerative disease, mitochondrial disease, declined endurance, declined promptness, lethargy, muscle wasting and depression.

13. A composition for alleviating a muscular disease caused by declined muscular function, muscular wasting or muscular atrophy or muscle damage, comprising the *Gynostemma pentaphyllum* leaf extract according to claim 10 as an active ingredient.

14. The composition according to claim 13, wherein the muscular disease is one or more selected from atony, muscular atrophy, muscular dystrophy, myasthenia, cachexia and sarcopenia, and wherein the muscle damage is one or more selected from muscle strain, muscle rupture, muscle tearing, contusion, sprain, rotator cuff syndrome and myositis.

15. A composition for reducing body weight and body fat, comprising the *Gynostemma pentaphyllum* leaf extract according to claim 10 as an active ingredient.

* * * * *